(12) United States Patent
Itagaki et al.

(10) Patent No.: US 8,149,745 B2
(45) Date of Patent: *Apr. 3, 2012

(54) WIRELESS COMMUNICATION SYSTEM, WIRELESS COMMUNICATION DEVICE, WIRELESS COMMUNICATION METHOD, AND PROGRAM

(75) Inventors: Takeshi Itagaki, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

This patent is subject to a terminal disclaimer.

(21) Appl. No.: 12/328,737

(22) Filed: Dec. 4, 2008

(65) Prior Publication Data

US 2009/0168736 A1 Jul. 2, 2009

(30) Foreign Application Priority Data

Dec. 26, 2007 (JP) ................................ P2007-334205

(51) Int. Cl.
*H04B 7/00* (2006.01)
*H04B 7/14* (2006.01)
*H04B 17/00* (2006.01)
*H04W 4/00* (2009.01)

(52) U.S. Cl. ...................... 370/310.2; 370/315; 370/332; 370/338; 455/67.11; 455/226.2

(58) Field of Classification Search .......... 370/310–350; 455/11.1, 74.1, 86, 100, 412.2, 414.1, 418, 455/420, 464, 510, 573, 572; 709/206, 220, 709/243
See application file for complete search history.

(56) References Cited

U.S. PATENT DOCUMENTS

| | | | |
|---|---|---|---|
| 6,791,962 B2 * | 9/2004 | Wentink ........................ 370/338 |
| 7,542,723 B2 * | 6/2009 | Waxman ..................... 455/67.11 |
| 7,545,771 B2 * | 6/2009 | Wentink et al. ............... 370/329 |
| 7,577,125 B2 | 8/2009 | Abhishek et al. |
| 7,630,348 B2 * | 12/2009 | Kim .............................. 370/338 |
| 2004/0246934 A1 * | 12/2004 | Kim .............................. 370/338 |
| 2005/0094588 A1 * | 5/2005 | Wentink ........................ 370/315 |
| 2005/0135305 A1 * | 6/2005 | Wentink ........................ 370/329 |
| 2006/0087995 A1 * | 4/2006 | Nago ............................ 370/310 |
| 2006/0120334 A1 * | 6/2006 | Wang et al. ................... 370/338 |
| 2007/0008922 A1 | 1/2007 | Abhishek et al. |
| 2007/0104138 A1 * | 5/2007 | Rudolf et al. ................. 370/329 |
| 2008/0075038 A1 * | 3/2008 | Jin et al. ........................ 370/329 |
| 2008/0095072 A1 * | 4/2008 | Shao et al. .................... 370/254 |
| 2009/0268653 A1 * | 10/2009 | Itagaki et al. ................. 370/311 |
| 2009/0303934 A1 | 12/2009 | Abhishek et al. |
| 2010/0257265 A1 * | 10/2010 | Hamada ........................ 709/224 |

FOREIGN PATENT DOCUMENTS

| | | |
|---|---|---|
| JP | 2003-348103 | 12/2003 |
| JP | 2007-096862 | 4/2007 |
| JP | 2009-500969 | 1/2009 |
| WO | WO 2007-008857 | 1/2007 |

* cited by examiner

*Primary Examiner* — Tri H Phan
(74) *Attorney, Agent, or Firm* — Finnegan, Henderson, Farabow, Garrett & Dunner, L.L.P.

(57) ABSTRACT

A wireless communication system is provided that includes a first wireless communication device, a second wireless communication device, and a base station that relays wireless communication between the first and second wireless communication devices. The first wireless communication device is capable of direct communication with another wireless communication device, and transmits a first data frame of a particular frame type to the second wireless communication device via the base station. If the second wireless communication device is capable of the direct communication, when receiving the first data frame of the particular frame type, the second wireless communication device transmits a second data frame of the particular frame type via the base station. When the first wireless communication device receives the second data frame from the second wireless communication device, it determines that the second wireless communication device is capable of the direct communication.

15 Claims, 11 Drawing Sheets

WIRELESS COMMUNICATION SYSTEM, WIRELESS COMMUNICATION DEVICE, WIRELESS COMMUNICATION METHOD, AND PROGRAM

CROSS REFERENCES TO RELATED APPLICATION(S)

The present invention contains subject matter related to Japanese Patent Application JP 2007-334205 filed in the Japan Patent Office on Dec. 26, 2007, the entire contents of which being incorporated herein by reference.

BACKGROUND OF THE INVENTION

1. Field of the Invention

The present invention relates to a wireless communication system, a wireless communication device, a wireless communication method, and a program.

2. Description of the Related Art

Recently, local area network (LAN) standards such as IEEE802.11a and IEEE802.11b have been established. These LAN standards define an infrastructure mode and an ad hoc mode. In the infrastructure mode, an access point (base station) adjusts access timing of a plurality of wireless communication devices. In the ad hoc mode, access timing is determined between wireless terminal devices.

The infrastructure mode in which communication is performed via an access point is disadvantageous in that throughput decreases in comparison with the ad-hoc mode, but it is advantageous in that managed wireless communication devices can access a wired LAN and the Internet. In the ad-hoc mode, wireless communication devices directly communicate with each other, and there is therefore no overhead due to access point relay, and throughput increases. However, the ad-hoc mode is disadvantageous in that a wired LAN and the Internet cannot be accessed.

As a method to exploit the advantages of both modes, a direct link protocol (DLP) method is defined as an optional function of 802.11e. According to the DLP method, wireless communication devices can directly communicate with each other by setting a direct link (direct communication link) while maintaining the infrastructure mode.

For example, Japanese Patent Application Publication No. JP-A-2003-348103 discloses a technology relating to the DLP method. More specifically, Japanese Patent Application Publication No. JP-A-2003-348103 discloses a technology in which a wireless communication device confirms, through communication via an access point, whether or not another wireless communication device is compatible with the DLP method. After confirming that the other wireless communication device is compatible with the DLP method, the wireless communication device directly communicates with the other wireless communication device.

SUMMARY OF THE INVENTION

When an access point (base station) is compatible with the DLP method, the known wireless communication device can confirm whether or not another wireless communication device is compatible with the DLP method via the access point. However, when the access point is not compatible with the DLP method, the known wireless communication device cannot use the DLP method.

The present invention addresses the problem described above and provides a wireless communication system, a wireless communication device, a wireless communication method, and a program that are new and improved and that are capable of determining whether or not another wireless communication device is capable of direct communication, irrespective of a function of a base station.

According to an embodiment of the present invention, there is provided a wireless communication system that includes a first wireless communication device, a second wireless communication device, and a base station that relays wireless communication between the first and the second wireless communication devices. The first wireless communication device is capable of direct communication with another wireless communication device, and transmits a first data frame of a particular frame type to the second wireless communication device via the base station. If the second wireless communication device is capable of the direct communication, when receiving the first data frame of the particular frame type, the second wireless communication device transmits a second data frame of the particular frame type via the base station. When the first wireless communication device receives the second data frame from the second wireless communication device, the first wireless communication device determines that the second wireless communication device is capable of the direct communication.

In the above-described configuration, irrespective of whether or not a first data frame and a second data frame of a particular frame type are frames to establish direct communication, the base station relays the first data frame and the second data frame between the first and second wireless communication devices. When the second wireless communication device receives the first data frame of the particular frame type relayed by the base station, if the second wireless communication device is capable of direct communication, it transmits the second data frame of the particular frame type. Further, the first wireless communication device can determine that the second wireless communication device is capable of direct communication, based on the fact that it has received the second data frame of the particular frame type relayed by the base station. That is, even when the base station cannot interpret the contents of the first and second data frames of the particular frame type, the first wireless communication device can confirm whether or not the second wireless communication device is capable of direct communication.

When the first wireless communication device determines that the second wireless communication device is capable of the direct communication, the first wireless communication device may transmit a predetermined data frame. When the base station receives the predetermined data frame from the first wireless communication device, the base station may transmit the predetermined data frame to the second wireless communication device. The second wireless communication device may measure signal quality of both the predetermined data frame transmitted from the first wireless communication device and the predetermined data frame transmitted from the base station, and may transmit the measured signal quality to the first wireless communication device.

In the above-described configuration, when the first wireless communication device transmits a predetermined data frame via the base station, the second wireless communication device can receive the data frame transmitted from the first wireless communication device, in addition to the data frame relayed by the base station, and can measure the signal quality of both data frames. Therefore, if the first wireless communication device transmits the predetermined data frame via the base station, the second wireless communication device can measure the signal quality of both data frames, without direct data frame transmission to the second wireless communication device. As a result, a transmission processing load on the first wireless communication device can be reduced. In addition, the amount of traffic can be reduced, leading to effective use of a bandwidth.

The first wireless communication device may determine, based on the signal quality transmitted from the second wireless communication device, whether to communicate with the second wireless communication device via the base station or to perform the direct communication. For example, the first wireless communication device can perform communication via the base station or direct communication, whichever provides better signal quality.

When the first wireless communication device determines that the second wireless communication device is capable of the direct communication, the first wireless communication device may transmit a predetermined data frame to the second wireless communication device via the base station, and also transmit the predetermined data frame to the second wireless communication device directly. The second wireless communication device may sequentially measure signal quality of both the predetermined data frame directly received from the first wireless communication device and the predetermined data frame received from the base station, and transmit the measured signal quality to the first wireless communication device. In this configuration, even when the second wireless communication device cannot directly receive from the first wireless communication device the data frame transmitted from the first wireless communication device via the base station, the second wireless communication device can measure the signal quality of both the data frame transmitted from the first wireless communication device and the data frame transmitted from the base station.

When the first wireless communication device determines that the second wireless communication device is capable of the direct communication, the first wireless communication device may transmit a third data frame of the particular frame type to the second wireless communication device. When the second wireless communication device receives the third data frame from the first wireless communication device, the second wireless communication device may transmit a predetermined data frame to the first wireless communication device via the base station. In this configuration, the first wireless communication device can measure the signal quality of the data frame transmitted from the second wireless communication device to the first wireless communication device.

The second wireless communication device may further transmit the predetermined data frame to the first wireless communication device directly.

When the second wireless communication device receives the first data frame from the first wireless communication device, the second wireless communication device may measure signal quality of subsequently transmitted data frames. In this configuration, when the first wireless communication device transmits a data frame before transmitting a predetermined data frame, the second wireless communication device can also regard the predetermined data frame as a target for signal quality measurement.

When the first wireless communication device transmits the first data frame, the first wireless communication device may measure signal quality of subsequently transmitted data frames. In this configuration, when the second wireless communication device transmits a data frame before transmitting a predetermined data frame, the first wireless communication device can also regard the predetermined data frame as a target for signal quality measurement.

When the base station receives a data frame from one of the first wireless communication device and the second wireless communication device, the base station may transmit the data frame to a destination wireless communication device without regard to whether the data frame is of the particular frame type.

When the first wireless communication device confirms presence of the second wireless communication device based on a universal plug and play (UPnP) protocol, the first wireless communication device may transmit the first data frame.

According to another embodiment of the present invention, there is provided a wireless communication device capable of communication with another wireless communication device via a base station, including: a transmitting portion that transmits a first data frame of a particular frame type to the other wireless communication device via the base station; a receiving portion that, when the other wireless communication device has a direct communication function with the wireless communication device, receives a second data frame of the particular frame type that is transmitted from the other wireless communication device in response to the first data frame; and a determination portion that, when the receiving portion receives the second data frame from the other wireless communication device, determines that the other wireless communication device has the direct communication function.

According to another embodiment of the present invention, there is provided a wireless communication device capable of communication with another wireless communication device via a base station, including: a receiving portion that receives a first data frame of a particular frame type from the other wireless communication device; and a transmitting portion that, when the wireless communication device has a direct communication function with the other wireless communication device, transmits a second data frame of the particular frame type in response to the first data frame.

According to another embodiment of the present invention, there is provided a wireless communication method performed in a wireless communication system that includes a first wireless communication device, a second wireless communication device, and a base station that relays wireless communication between the first and the second wireless communication devices. The wireless communication method includes the steps of: transmitting a first data frame of a particular frame type from the first wireless communication device capable of direct communication with another wireless communication device to the second wireless communication device via the base station; receiving the first data frame by the second wireless communication device; transmitting a second data frame of the particular frame type from the second wireless communication device when the second wireless communication device is capable of the direct communication; receiving the second data frame by the first wireless communication device; and determining, by the first communication device, that the second wireless communication device is capable of the direct communication.

According to another embodiment of the present invention, there is provided a program including instructions that command a computer, provided in a wireless communication device capable of communication with another wireless communication device via a base station, to function as a control portion executing the steps of: causing a transmitting device to transmit a first data frame of a particular frame type to the other wireless communication device via the base station; causing a receiving device to receive a second data frame of the particular frame type that is transmitted from the other wireless communication device in response to the first data frame when the other wireless communication device has a direct communication function with the wireless communication device; and determining, when the receiving device receives the second data frame from the other wireless communication device, that the other wireless communication device has the direct communication function.

The above-described program can cause a hardware resource of a computer including, for example, a CPU, a ROM and a RAM to execute the function of the control portion as described above. That is, a computer that uses the program can be caused to function as the above-described control portion.

According to the embodiments of the present invention described above, whether or not another wireless communication device is capable of direct communication can be determined irrespective of the function of a base station.

DETAILED DESCRIPTION OF THE PREFERRED EMBODIMENTS

Figure 1:
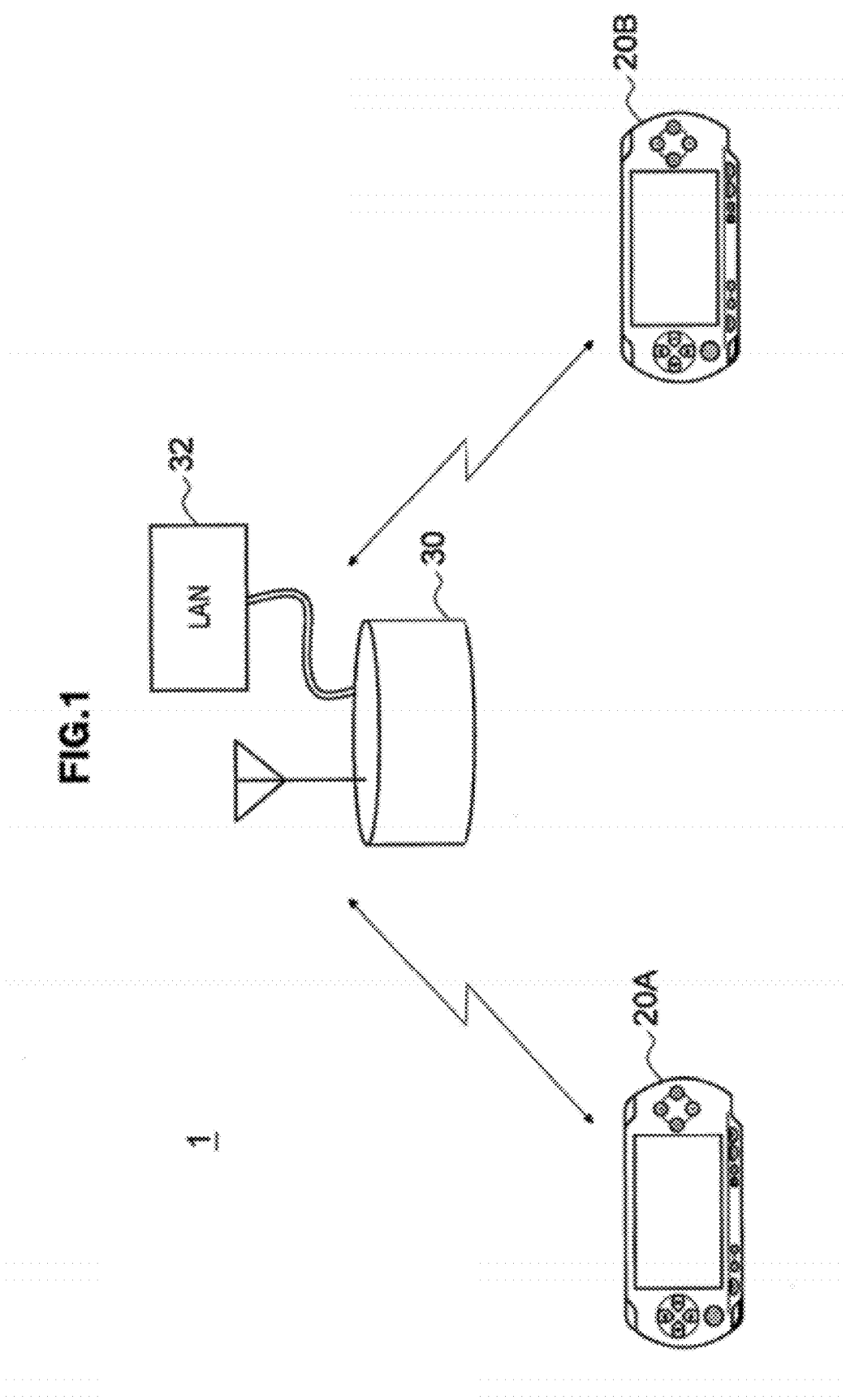
FIG. 1 is an explanatory diagram that shows a configuration of a wireless communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments for practicing the present invention will be explained in the order shown below.

1. Overview of wireless communication system according to the present embodiment
2. Background of the present embodiment
3. Configuration of wireless communication device
4. Operation of the wireless communication system
4-1. First operation example
4-2. Second operation example
4-3. Third operation example
4-4. Fourth operation example
4-5. Fifth operation example
5. Conclusion

1. OVERVIEW OF WIRELESS COMMUNICATION SYSTEM ACCORDING TO THE PRESENT EMBODIMENT

First, an overview of a wireless communication system 1 according to the present embodiment will be explained with reference to FIG. 1.

FIG. 1 is an explanatory diagram that shows a configuration of the wireless communication system 1 according to the present embodiment. As shown in FIG. 1, the wireless communication system 1 includes a wireless communication device 20A, a wireless communication device 20B, a base station 30, and a LAN 32.

The base station 30 manages the wireless communication device 20A and the wireless communication device 20B that are present within a radio wave reachable range of the base station 30. Further, the base station 30 is connected to the LAN 32 that functions as a backbone network such as Ethernet (registered trademark). When the LAN 32 and the wireless communication device 20A or the wireless communication device 20B communicate, the base station 30 relays communication between the LAN 32 and the wireless communication device 20A or the wireless communication device 20B.

Further, the base station 30 controls communication performed by the managed wireless communication device 20A and wireless communication device 20B. For example, the base station 30 periodically transmits a beacon, which is a communication control signal, and the wireless communication device 20A and the wireless communication device 20B receive the beacon, thereby sharing timing in the wireless communication system 1.

In addition, when the base station 30 receives a data frame addressed to the wireless communication device 20B that is transmitted from the wireless communication device 20A, the base station 30 transmits the received data frame to the wireless communication device 20B. More specifically, the address of the wireless communication device 20A is described in a transmitter address (TA) of the data frame addressed to the wireless communication device 20B that is transmitted from the wireless communication device 20A. The address of the base station 30 is described in a receiver address (RA), and the address of the wireless communication device 20B is described in a destination address (DA). When the base station 30 receives the data frame, it changes the RA to the address of the wireless communication device 20B that has been described in the DA, describes in a source address (SA) the address of the wireless communication device 20A that has been described in the TA, changes the TA to the address of the base station 30, and transmits the data frame. Thus, the wireless communication device 20B can receive the data frame in which the address of the own device is described in the RA.

Note that, in FIG. 1, portable game consoles are shown as an example of the wireless communication devices 20A and 20B. However, the wireless communication devices 20A and 20B are not limited to this example. For example, each of the wireless communication devices 20A and 20B may also be an information processing device such as a personal computer (PC), a home video processing device (a DVD recorder, a video deck or the like.), a mobile telephone, a personal handyphone system (PHS), a mobile music playback device, a mobile video processing device, a personal digital assistant (PDA), a home game console, a household electrical appliance or the like. Further, the data frame transmitted or received by the wireless communication device 20 may include audio data such as music, a lecture, a radio program or the like, visual data such as a motion picture, a television program, a video program, a photograph, a document, a painting, a diagram or the like, and any other type of data such as a game, software or the like. Note that, in FIG. 1, in order to distinguish the respective wireless communication devices, a capital letter of the alphabet is added after each reference numeral, such as for the wireless communication devices 20A and 20B. However, when there is no need to particularly distinguish the respective wireless communication devices, they are collectively referred to as the wireless communication devices 20.

In FIG. 1, the wireless communication devices 20A and 20B are shown as the wireless communication devices 20 managed by the single base station 30. However, the single base station 30 may manage three or more wireless communication devices 20. Further, the LAN 32 is shown as an example of a communication network in FIG. 1. Other examples of the communication network include a leased line network such as a wide area network (WAN), an internet protocol-virtual private network (IP-VPN), and the like.

In the above-described wireless communication system 1, in addition to wireless communication via the base station 30, the wireless communication devices 20A and 20B can directly communicate with each other by setting a direct link. Hereinafter, the flow until the wireless communication devices 20A and 20B set a direct link will be briefly described with reference to FIG. 2.

Figure 2:
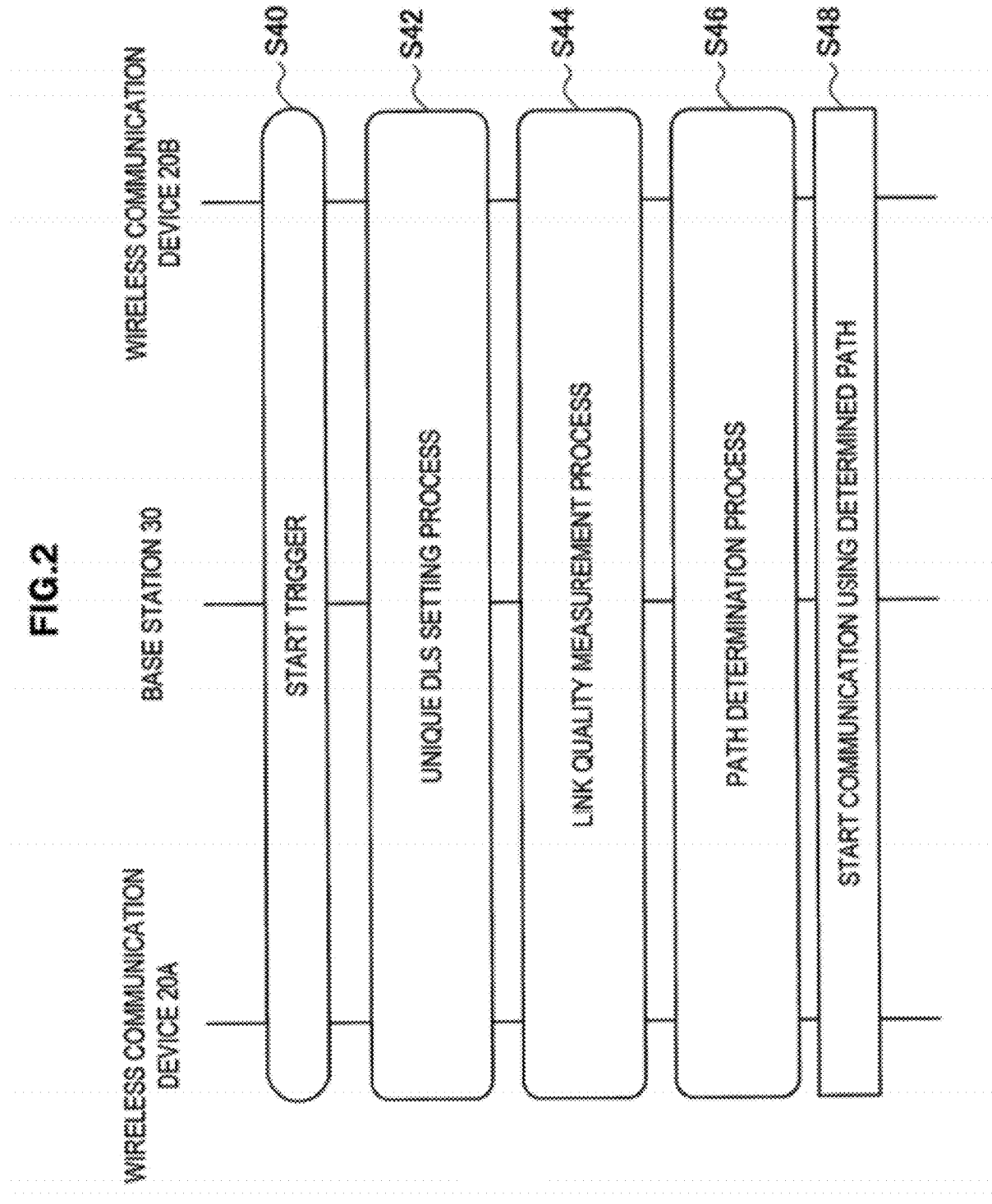
FIG. 2 is a sequence diagram that shows the flow until a plurality of communication devices set a direct link.

FIG. 2 is a sequence diagram that shows the flow until the plurality of communication devices 20 set a direct link. First, when the wireless communication devices 20A and 20B are operating normally in an infrastructure mode, a setting operation of a direct link setup (DLS) (hereinafter referred to as a unique DLS, which allows direct communication) that is not dependent on the base station 30 is started based on the generation of a start trigger (step S40).

Then, the wireless communication device 20A, the base station 30 and the wireless communication device 20B perform a unique DLS setting process (step S42). The unique DLS setting process is a series of frame exchange operations in which the wireless communication devices 20A and 20B transmit, receive and share information about their communication functions, capabilities and the like. Then, the wireless communication device 20A, the base station 30 and the wireless communication device 20B perform a link quality measurement process (step S44). The link quality measurement process is a series of operations for obtaining information about a link quality of a direct link path between the wireless communication devices 20A and 20B, and about a link quality of a base station path between the wireless communication devices 20A and 20B via the base station 30.

Then, at least one of the wireless communication device 20A, the base station 30 and the wireless communication device 20B performs a path determination process (step S46). The path determination process is an operation to judge and determine which communication path, of the direct link path and the base station path, should be used for communication between the wireless communication devices 20A and 20B. The wireless communication device 20A and the wireless communication device 20B start communication using the communication path determined in the path determination process (step S48).

2. BACKGROUND OF THE PRESENT EMBODIMENT

Hereinabove, the wireless communication system 1 according to the present embodiment has been outlined with reference to FIG. 1 and FIG. 2. Next, the background to create the wireless communication system 1 according to the present embodiment will be described.

In order to perform the unique DLS setting process as described above, for example, the wireless communication device 20A transmits to the base station 30 a data frame in accordance with a direct link protocol (DLP) method to inquire about the communication functions corresponding to the wireless communication device 20B. The base station 30 interprets the data frame, and transmits it to the wireless communication device 20B. Then, the wireless communication device 20B interprets the data frame received from the wireless communication device 20A via the base station 30, and transmits to the base station 30 a data frame in response to the aforementioned data frame. Thereafter, the base station 30 interprets the data frame received from the wireless communication device 20B, and transmits it to the wireless communication device 20A. Thus, the wireless communication device 20A can perform the unique DLS setting process based on the data frame from the wireless communication device 20B received in this manner.

However, if the wireless communication devices 20A and 20B are compatible with the DLP method, but the base station 30 is not compatible with the DLP method, the base station 30 cannot interpret the data frame transmitted from the wireless communication devices 20A and 20B. Therefore, there may be cases where the base station 30 cannot relay the data frame.

To address this, the wireless communication system 1 according to the present embodiment has been created by focusing on the above-described circumstances. In the wireless communication system 1 according to the present embodiment, the wireless communication devices 20A and 20B can perform the unique DLS setting process, the link quality measurement process and the like, irrespective of whether or not the base station 30 is compatible with the DLP method. The wireless communication system 1, the wireless communication device 20A and the wireless communication device 20B that can perform the above will hereinafter be described in more detail.

3. CONFIGURATION OF WIRELESS COMMUNICATION DEVICE

Figure 3:
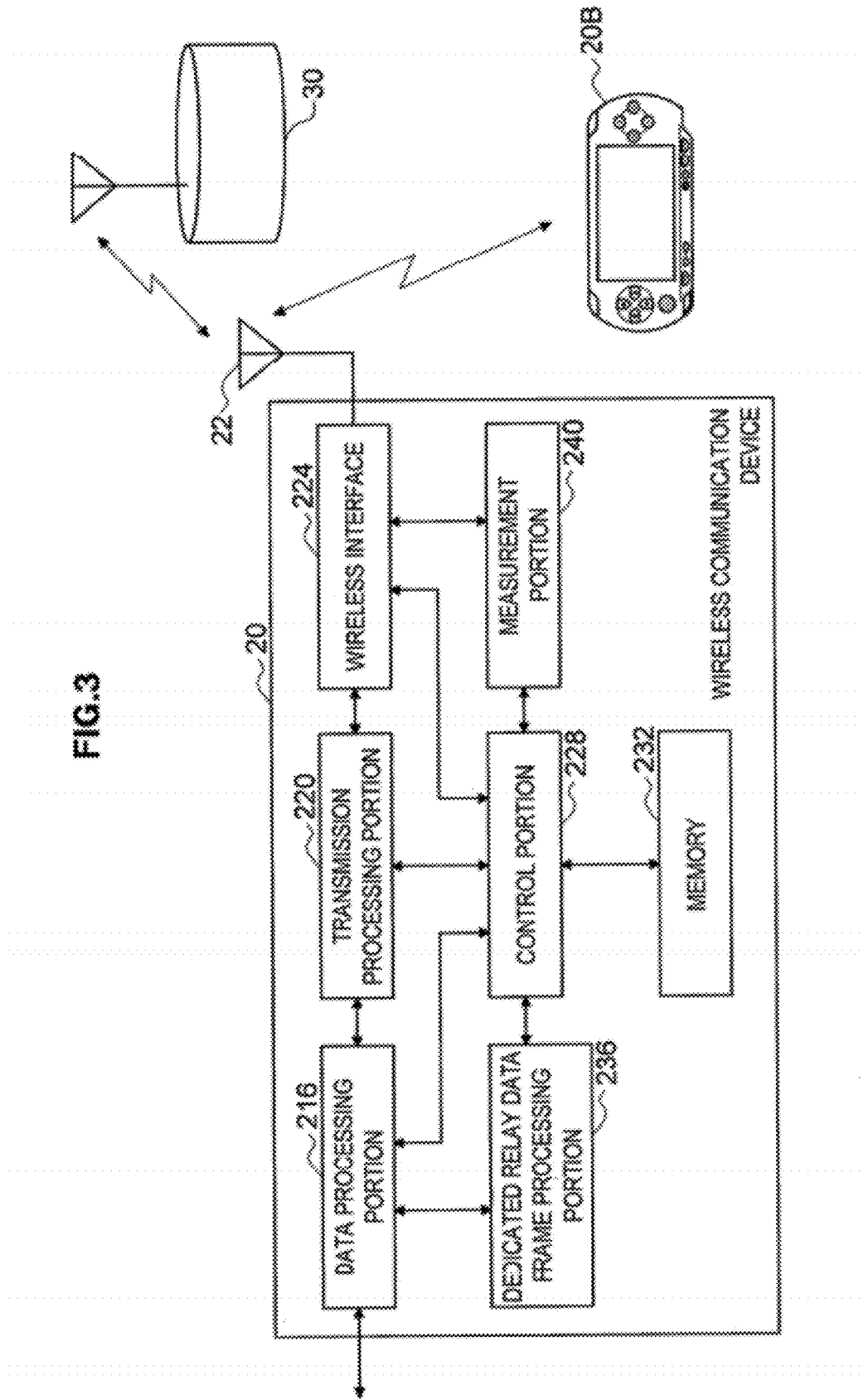
FIG. 3 is an explanatory diagram that shows a configuration of a wireless communication device according to the embodiment.

FIG. 3 is an explanatory diagram that shows a configuration of the wireless communication device 20 according to the present embodiment. As shown in FIG. 3, the wireless communication device 20 includes an antenna 22, a data processing portion 216, a transmission processing portion 220, a wireless interface 224, a control portion 228, a dedicated relay data frame processing portion 236, and a measurement portion 240.

In transmission, the data processing portion 216 generates various types of data frames according to a request from, for example, a higher-level layer and supplies them to the transmission processing portion 220. Further, in reception, the data processing portion 216 processes and analyses the various types of data frames supplied from the transmission processing portion 220. Examples of the various types of data frames include: a management frame such as an association request, an association response, a probe request, a probe response, an authentication request, a deauthentication request, a reserve request and the like; a control frame such as request to send (RTS), clear to send (CTS), acknowledgment (ACK) and the like; and an arbitrary frame such as a frame including actual data.

In transmission, the transmission processing portion 220 adds a header and an error detection code, such as a frame check sequence (FCS), to the various types of data frames supplied from the data processing portion 216, and supplies the data frames to the wireless interface 224. Further, in reception, the transmission processing portion 220 analyses the header added to each of the various types of data frames supplied from the wireless interface 224. When the transmission processing portion 220 confirms that there is no error in each data frame based on the error detection code, it supplies the various types of data frames to the data processing portion 216. Note that the header may include frame control information, duration, TA, RA, SA, DA, sequence control information, and the like.

In transmission, the wireless interface 224 generates a modulation signal in a frequency band of a carrier wave based on the various types of data frames supplied from the transmission processing portion 220, and causes the antenna 22 to transmit the modulation signal as a wireless signal. Further, in reception, the wireless interface 224 decodes the various types of data frames, by down-converting the wireless signal received by the antenna 22 and converting it to a bit sequence. That is, the wireless interface 224 can serve as a transmitting portion and a receiving portion by cooperating with the antenna 22. Note that, although the single antenna 22 is shown in FIG. 3, the wireless communication device 20 may include a plurality of the antennas 22 and may have a multiple input multiple output (MIMO) function.

The control portion 228 controls various operations, such as a reception operation and a transmission operation, of the wireless communication device 20. Further, as described later, the control portion 228 has a function as a determination portion that determines, in the unique DLS setting process, whether or not the wireless communication device 20B is compatible with the unique DLS.

The memory 232 serves as a data processing working area used by the control portion 228, and has a function as a storage medium storing various types of data. For example, the memory 232 may be a storage medium such as: a non-volatile memory such as an electrically erasable programmable read only memory (EEPROM), an erasable programmable read only memory (EPROM) or the like; a magnetic disk such as a hard disk, a disc-shaped magnetic disk or the like; an optical disk such as a compact disc recordable (CD-R)/rewritable (RW), a digital versatile disc recordable (DVD-R)/RW/+R/+RW/a random access memory (RAM), a blu-ray disc (BD) (registered trade mark)-R/BD-RE; and a magneto optical (MO) disk.

The dedicated relay data frame processing portion 236 generates, processes and analyses a dedicated relay data frame as a specific data frame that is important in the present embodiment. A specific configuration of the dedicated relay data frame will be described with reference to FIG. 5.

In the link quality measurement process, the measurement portion 240 measures the link quality of a data frame received from the wireless communication device 20B via the direct link path, and the link quality of a data frame received via the base station path. The link quality measured by the measurement portion 240 may be stored in the memory 232. Note that the link quality measured by the measurement portion 240 may be a received channel power indicator (RCPI) defined by IEEE802.11k, or may be a received signal strength indication (RSSI). When the measurement portion 240 measures the RCPI as the link quality, there are cases when the TA (the address of the transmitter device) of a measurement target data frame can be limited to a specific TA. For example, when the wireless communication device 20B transmits a data frame to the wireless communication device 20 via the base station 30, the measurement portion 240 may measure the RCPI of a data frame whose TA is the address of the wireless communication device 20B that is transmitted from the wireless communication device 20B to the base station 30, in addition to the RCPI of a data frame whose TA is the address of the base station 30 that is transmitted from the base station 30.

4. OPERATION OF THE WIRELESS COMMUNICATION SYSTEM

Next, an operation of the wireless communication system 1 according to the present embodiment will be described using first to fifth operation examples as specific examples.

4-1. First Operation Example

First, a first operation example of the wireless communication system 1 according to the present embodiment will be described with reference to FIG. 4 to FIG. 7.

Unique DLS Setting Process

Figure 4:
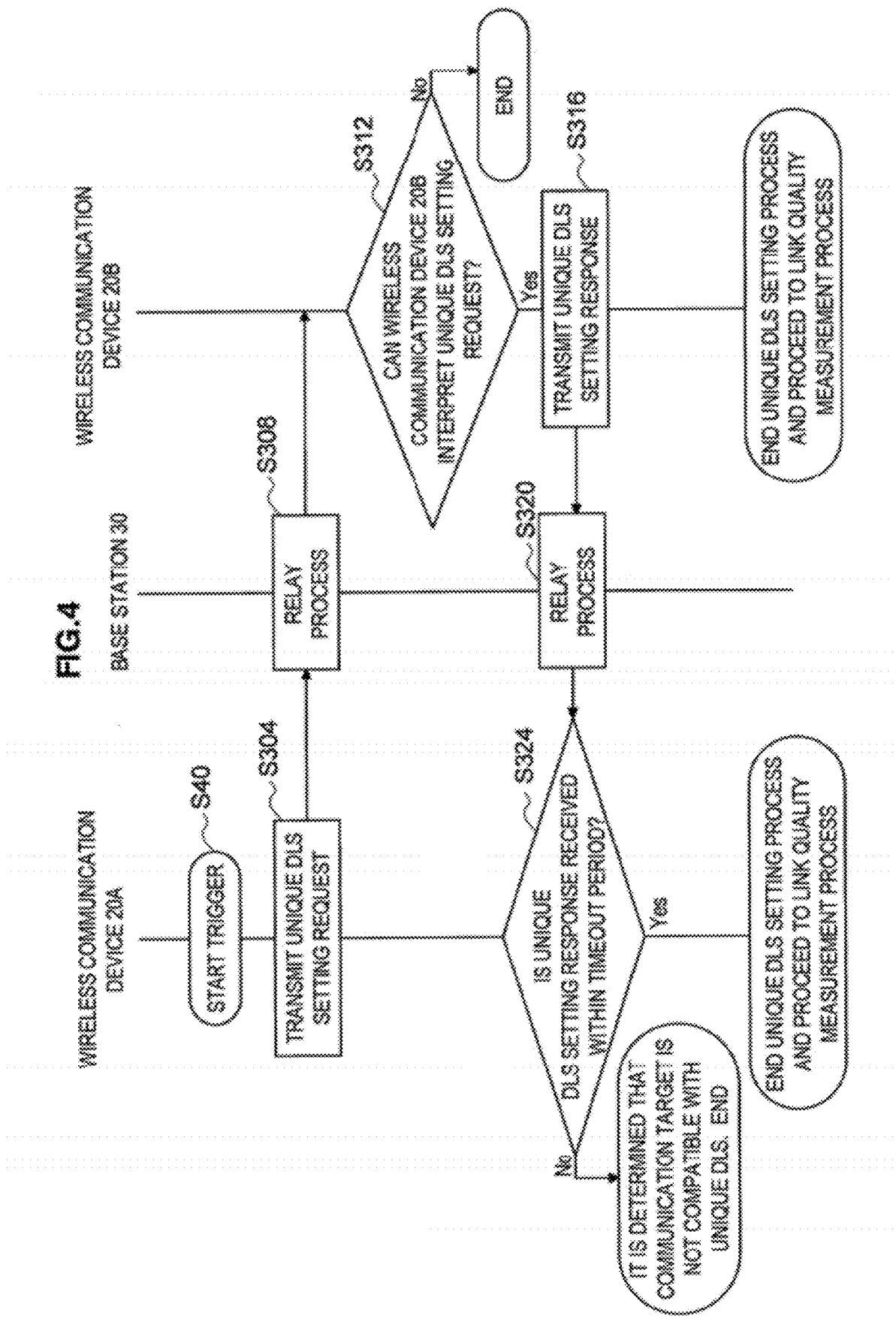
FIG. 4 is a sequence diagram that shows the flow of a unique direct link setup (DLS) setting process.

FIG. 4 is a sequence diagram that shows the flow of the unique DLS setting process. When a start trigger occurs, the wireless communication device 20A proceeds to the unique DLS setting process (step S40). Although a specific content of the start trigger is not particularly limited, a timing when the machine (MAC) address of the communication target (the wireless communication device 20B) is obtained corresponds to the start trigger.

Further, if the wireless communication devices 20A and 20B are compatible with a digital living network alliance (DLNA), device detection using a universal plug and play (UPnP) protocol, or occurrence of packet transmission/reception for service detection (SSDP M-SEARCH Req/Res packet, SSDP NOTIFY packet, HTTP get Req packet) can correspond to the start trigger. Thus, the device/service detection and the direct link setting can be performed at the same time. In addition, by setting such a condition, setup can be performed efficiently only with a device that requires the direct link setting.

Then, the wireless communication device 20A transmits a "unique DLS setting request" (a first data frame) to the wireless communication device 20B (step S304). More specifically, the unique DLS setting request frame is capsulated as a specific Ethertype data frame for the unique DLS. Hereinafter, in the present invention, the "data frame that is capsulated as a specific Ethertype for the unique DLS" is referred to as a "dedicated relay data frame". Here, a frame configuration of a data frame will be described with reference to FIG. 5.

Figure 5:
FIG. 5 is an explanatory diagram that shows an example of a frame configuration of a data frame.

FIG. 5 is an explanatory diagram that shows an example of a frame configuration of a data frame. As shown in FIG. 5, the data frame includes an 802.11 MAC header 104, and a MAC service data unit (MSDU) 110. The 802.11 MAC header 104 includes a TA indicating the transmitter address of the data frame, an RA indicating the receiver address of the data frame, and the like. For example, when the wireless communication device 20A transmits a data frame to the wireless communication device 20B via the base station 30, the 802.11 MAC header 104 includes the TA in which the address of the wireless communication device 20A is described, and the RA in which the address of the base station 30 is described, and the DA in which the address of the wireless communication device 20B is described.

The MSDU 110 includes a logical link control sub-network access protocol (LLCSNAP) 112, a type 114, and a payload 116.

The LLCSNAP 112 is an 8 byte fixed pattern, and is provided for logical link control. The type 114 is information indicating a frame type of the data frame. For example, 2 byte information indicating that the data frame is a dedicated relay data frame is described in the type 114 of the dedicated relay data frame. Further, a message for direct link setting is described in the payload 116 of the dedicated relay data frame.

Here, the flow of the unique DLS setting process will be described again with reference to FIG. 4. When the wireless communication device 20A transmits a "unique DLS setting request", the base station 30 receives the "unique DLS setting request". The "unique DLS setting request" includes an ID indicating that the content of the frame is the "unique DLS setting request", the MAC addresses of the wireless communication devices 20A and 20B, BSSID, capability information of the wireless communication device 20A, and the like. The base station 30 that has received such a "unique DLS setting request" relays the "unique DLS setting request" to the wireless communication device 20B without regard to the content of the "unique DLS setting request" (step S308).

When the wireless communication device 20B receives the "unique DLS setting request" from the wireless communication device 20A via the base station 30, it interprets the content of the "unique DLS setting request" from the Ethertype. When the wireless communication device 20B itself is compatible with the unique DLS and it can interpret the content of the "unique DLS setting request" (step S312), the wireless communication device 20B transmits a "unique DLS setting response" to the wireless communication device 20A (step S316). Like the "unique DLS setting request", the "unique DLS setting response" (a second data frame) also includes an ID indicating that the content of the frame is the "unique DLS setting response", the MAC addresses of the wireless communication devices 20A and 20B, BSSID, capability information of the wireless communication device 20B, success and failure information, and the like. Note that when the wireless communication device 20B is not compatible with the unique DLS, the "unique DLS setting request" is treated as an unknown Ethertype frame. Therefore, the wireless communication device 20B cannot interpret the content of the frame, and the frame is cleared in the wireless communication device 20B.

When the base station 30 receives the "unique DLS setting response" transmitted from the wireless communication device 20B, it relays the "unique DLS setting response" to the wireless communication device 20A without regard to the content of the "unique DLS setting response" (step S320). When the wireless communication device 20A receives the "unique DLS setting response" from the wireless communication device 20B via the base station 30, it interprets the content thereof from the Ethertype (step S324). When success and failure information of the "unique DLS setting response" indicates "success", the control portion 228 completes the setting of the unique DLS. On the other hand, when the wireless communication device 20A cannot receive the "unique DLS setting response" within a timeout period, the control portion 228 determines that the wireless communication device 20B is not compatible with the unique DLS, and a direct link is not established. When the setting of the unique DLS is completed, the wireless communication devices 20A and 20B proceed to the link quality measurement process.

Link Quality Measurement Process

Figure 6:
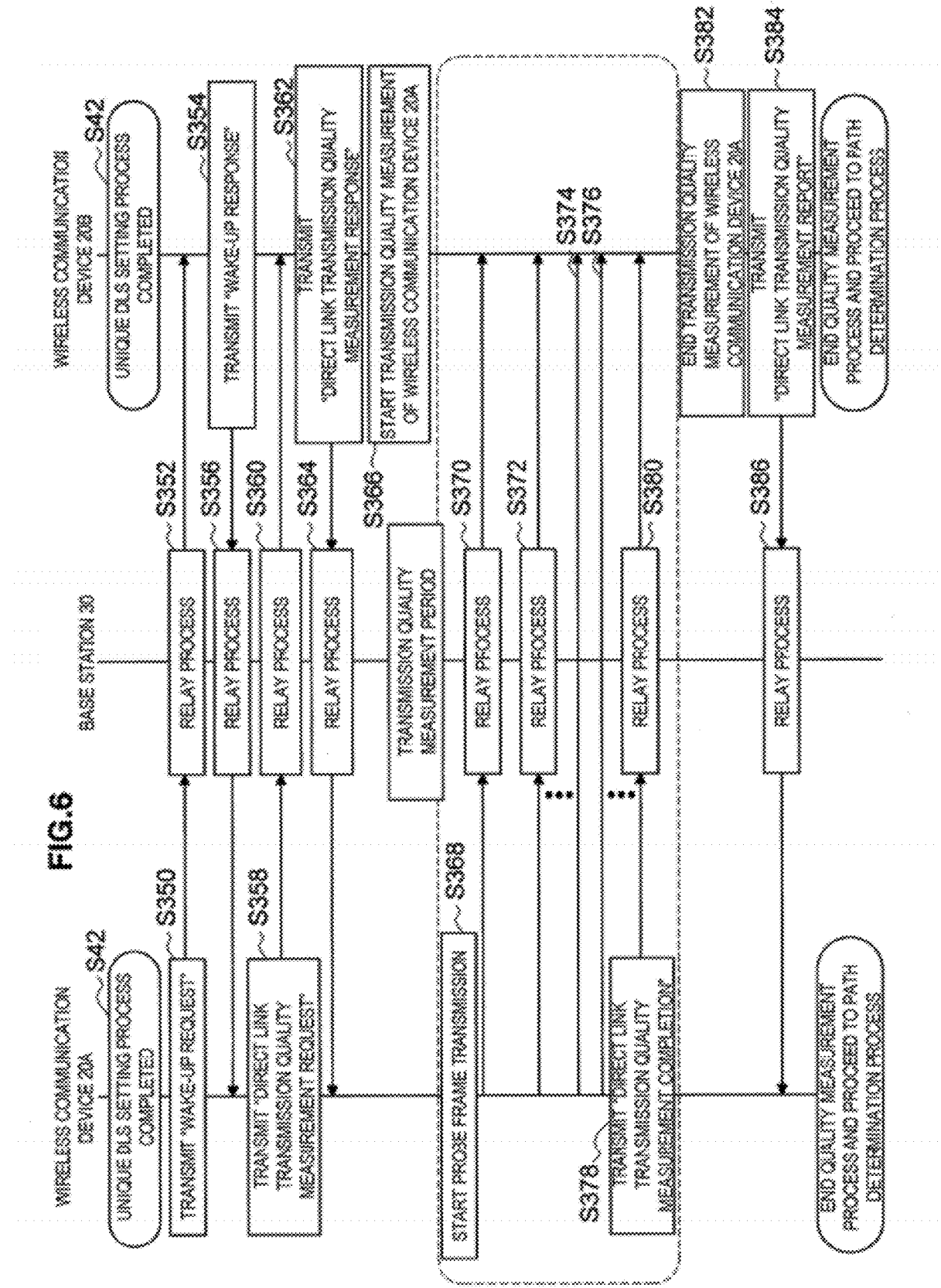
FIG. 6 is a sequence diagram that shows the flow of a link quality measurement process according to a first operation example.

FIG. 6 is a sequence diagram that shows the flow of a link quality measurement process according to the first operation example. The wireless communication device 20A uses the completion of the unique DLS setting process as a trigger, and immediately proceeds to a process to transmit a "direct link quality measurement request" to the wireless communication device 20B. Actually, data frames are transmitted and received via the base station 30 for security setting and the like, even after the setting of the unique DLS has been established. However, this process operates independently of them.

First, taking into consideration a case where the wireless communication device 20B that is expected to measure link quality is in a power save (PS) mode, the wireless communication device 20A transmits a "wake-up request", which is a dedicated relay data frame, to the wireless communication device 20B via the base station 30 (step S350 and step S352). When the wireless communication device 20B can receive the "wake-up request" and interpret the content thereof, it transmits a "wake-up response" frame, which is a dedicated relay data frame, to the wireless communication device 20A (step S354 and step S356), and maintains an awake state for a certain time period in accordance with the "wake-up request".

Then, the wireless communication device 20A that has received the "wake-up response" and interpreted the content thereof transmits a "direct link transmission quality measurement request", which is a dedicated relay data frame, to the wireless communication device 20B via the base station 30 (step S358 and step S360). The content of the "direct link transmission quality measurement request" includes the MAC address of the base station 30 (BSSID) and the MAC address of the wireless communication device 20A. When the wireless communication device 20B can receive and interpret the "direct link transmission quality measurement request", it transmits a "direct link transmission quality measurement response", which is a dedicated relay data frame, to the wireless communication device 20A via the base station 30 (step S362 and step S364). The "direct link transmission quality measurement response" includes information about whether or not the requested measurement is possible. Then, the wireless communication device 20B starts the measurement of the transmission quality of the wireless communication device 20A (step S366).

Then, if success and failure information included in the "direct link transmission quality measurement response" indicates "measurable", the wireless communication device 20A starts to transmit probe frames to cause the wireless communication device 20B to measure the transmission quality (step S368). After the wireless communication device 20A has transmitted probe frames via the base station 30 over a predetermined period (or a specified number of times) (step S370 and step S372), it transmits probe frames directly to the wireless communication device 20B (step S374 and step S376). More specifically, after the wireless communication device 20A has transmitted probe frames including the RA in which the address of the base station 30 is described and the DA in which the address of the wireless communication device 20B is described, the wireless communication device 20A transmits probe frames including the RA in which the address of the wireless communication device 20B is described. Note that the payload of each probe frame may also include no information.

After that, the wireless communication device 20A transmits a "direct link transmission quality measurement completion", which is a dedicated relay data frame (step S378), and the base station 30 relays the "direct link transmission quality measurement completion" to the wireless communication device 20B (step S380).

Until the wireless communication device 20B receives the "direct link transmission quality measurement completion" from the wireless communication device 20A, it receives the probe frames including the RA in which the address of the wireless communication device 20B is described (step S382). Then, for the frames whose TAs (transmitter addresses) are the address of the base station 30 (BSSID), and for the frames whose TAs are the address of the wireless communication device 20A (namely, traffic serving as a direct link path), the wireless communication device 20B measures received total channel power (RCPI) and the number of received packets, and stores the average value in the memory 232. The format of the RCPI may be the same as that defined by the 802.11k standard.

The wireless communication device 20B that has completed the measurement of the probe frames transmits a "direct link transmission measurement report" frame, which is a dedicated relay data frame, to the wireless communication device 20A via the base station 30 as soon as preparation for the measurement report is completed (step S384 and step S386). The "direct link transmission measurement report" includes the MAC address of the base station 30, the average RCPI of the probe frames whose TAs are the address of the base station 30, the MAC address of the wireless communication device 20A, and the average RCPI of the probe frames whose TAs are the address of the wireless communication device 20A. When the wireless communication device 20A can receive and interpret the "direct link transmission measurement report" from the wireless communication device 20B, it proceeds to the path determination process.

Path Determination Process

Figure 7:
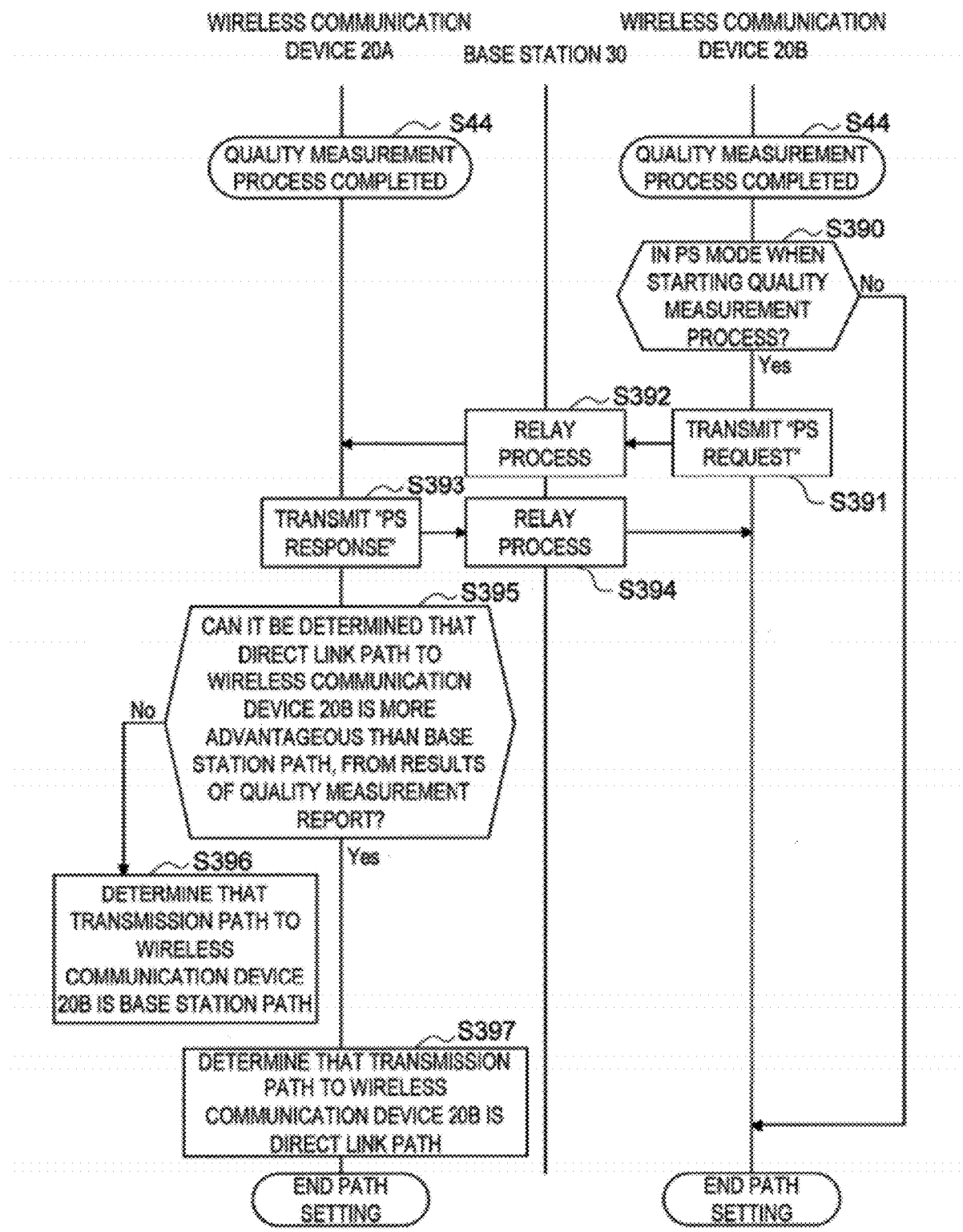
FIG. 7 is a sequence diagram that shows the flow of a path determination process.

FIG. 7 is a sequence diagram that shows the flow of the path determination process. As shown in FIG. 7, if the wireless communication device 20B that has measured the transmission quality of the wireless communication device 20A was in the PS mode before starting the measurement (step S390), it has already been forcibly awoken by the wireless communication device 20A. In this case, in order to return to the PS mode again, the wireless communication device 20B transmits a "PS notification", which is a dedicated relay data frame, to the wireless communication device 20A (step S391 and step S392). When the wireless communication device 20A can receive and interpret the "PS notification", it knows that the wireless communication device 20B will return to the PS mode, and transmits a "PS confirmation", which is a dedicated relay data frame, to the wireless communication device 20B (step 393 and step S394). When the wireless communication device 20B confirms the dedicated relay data frame "PS confirmation" transmitted from the wireless communication device 20A, it shifts to the PS mode.

At the time when the direct link measurement process is completed, the wireless communication device 20A has already obtained information about the "RCPI of the base station path" and the "RCPI of the direct link path". Therefore, the control portion 228 of the wireless communication device 20A determines, based on the above information, which path (i.e., either the base station path or the direct link path) to use for packet transmission from the wireless communication device 20A to the wireless communication device 20B (step S395). More specifically, the control portion 228 compares the RCPI of the direct link path with a threshold set in advance and with the RCPI of the base station path to evaluate the quality of the direct link, and determines whether to use the direct link. When it is determined that the use of the direct link path is disadvantageous compared to the use of the base station path, the wireless communication device 20A determines that the transmission path to the wireless communication device 20B is the base station path (step S396). On the other hand, when it is determined that the use of the direct link path is more advantageous than the use of the base station path, the wireless communication device 20A determines that the transmission path to the wireless communication device 20B is the direct link path (step S397). Note that the wireless state can be roughly estimated from the number of frames that can be received through the direct link (the direct link from the wireless communication device 20A to the wireless communication device 20B).

4-2. Second Operation Example

The first operation example of the wireless communication system 1 according to the present embodiment is described above. In the first operation example, the wireless communication device 20A needs to transmit both the probe frames addressed to the base station 30 and the probe frames addressed to the wireless communication device 20B. On the other hand, in a second operation example, it is possible to eliminate the transmission process of the probe frames addressed to the wireless communication device 20B that is performed by the wireless communication device 20A. As a result, a link quality measurement process of the second operation example differs from that of the first operation example. Hereinafter, the link quality measurement process according to the second operation example will be described with reference to FIG. 8.

Figure 8:
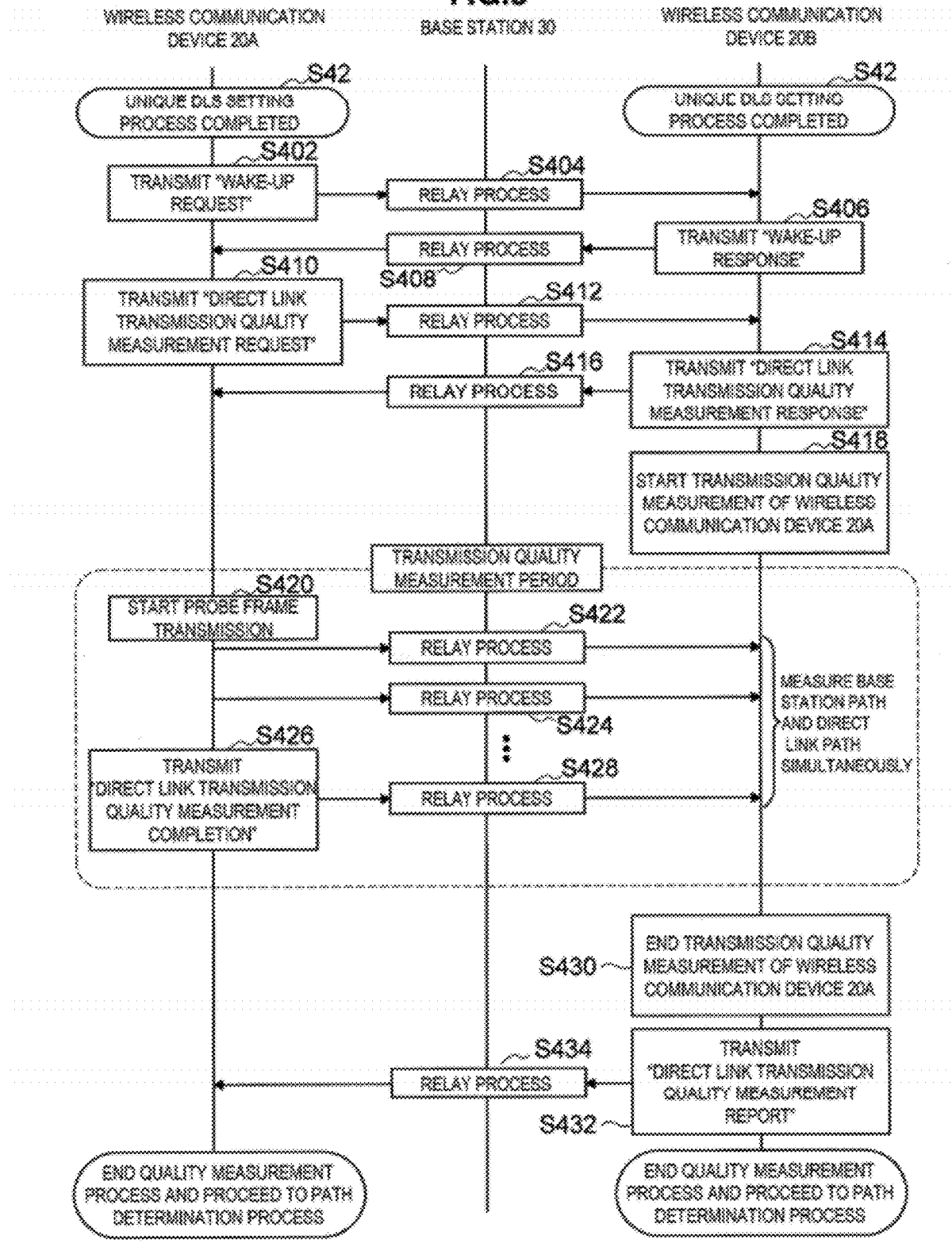
FIG. 8 is a sequence diagram that shows the flow of a link quality measurement process according to a second operation example.

FIG. 8 is a sequence diagram that shows the flow of the link quality measurement process according to the second operation example. As shown in FIG. 8, taking into consideration a case where the wireless communication device 20B that is expected to measure link quality is in a power save (PS) mode, the wireless communication device 20A transmits a "wake-up request", which is a dedicated relay data frame, to the wireless communication device 20B via the base station 30 (step S402 and step S404). When the wireless communication device 20B can receive the "wake-up request" and interpret the content thereof, it transmits a "wake-up response" frame, which is a dedicated relay data frame, to the wireless communication device 20A (step S406 and step S408), and maintains an awake state for a certain time period in accordance with the "wake-up request".

Then, the wireless communication device 20A that has received the "wake-up response" and interpreted the content thereof transmits a "direct link transmission quality measurement request" frame, which is a dedicated relay data frame, to the wireless communication device 20B via the base station 30 (step S410 and step S412). The content of the "direct link transmission quality measurement request" includes the MAC address of the base station 30 (BSSID) and the MAC address of the wireless communication device 20A. When the wireless communication device 20B can receive and interpret the "direct link transmission quality measurement request", it transmits a "direct link transmission quality measurement response", which is a dedicated relay data frame, to the wireless communication device 20A via the base station 30 (step S414 and step S416). The "direct link transmission quality measurement response" includes information about whether or not the requested measurement is possible. Then, the wireless communication device 20B starts the measurement of the transmission quality of the wireless communication device 20A (step S418).

In the second operation example, when the wireless communication device 20A transmits a probe frame via the base station 30, it is assumed that the wireless communication device 20B can receive both the probe frame transmitted from the base station 30 and the probe frame transmitted from the wireless communication device 20A. In other words, it is assumed that the wireless communication device 20B can receive the probe frame including the RA in which the address of the wireless communication device 20B is described, and the probe frame including the RA in which the address of the base station 30 is described. Further, it is assumed that the wireless communication device 20A has recognized the matter in the unique DLS setting process.

Then, if success and failure information included in the "direct link transmission quality measurement response" indicates "measurable", the wireless communication device 20A starts to transmit a probe frame to cause the wireless communication device 20B to measure the transmission quality (step S420). More specifically, the wireless communication device 20A transmits a probe frame including the RA in which the address of the base station 30 is described, the TA in which the address of the wireless communication device 20A is described and the DA in which the address of the wireless communication device 20B is described, a specified number of times. The base station 30 changes the RA of each of the probe frames received from the wireless communication device 20A to the address of the wireless communication device 20B, changes the TA to the address of the base station 30, and transmits the probe frames (step S422 and step S424).

After that, the wireless communication device 20A transmits a "direct link transmission quality measurement completion", which is a dedicated relay data frame (step S426), and the base station 30 relays the "direct link transmission quality measurement completion" to the wireless communication device 20B (step S428).

Until the wireless communication device 20B receives the "direct link transmission quality measurement completion" from the wireless communication device 20A, it receives the probe frames including the TA in which the address of the wireless communication device 20A is described that are transmitted from the wireless communication device 20A, in addition to the probe frames including the RA in which the address of the wireless communication device 20B is described that are transmitted from the base station 30 (step S430). Then, for the probe frames transmitted from the base station 30 and for the probe frames transmitted from the wireless communication device 20A, the wireless communication device 20B measures received total channel power (RCPI) and the number of received packets, and stores the average value in the memory 232. The format of the RCPI may be the same as that defined by the 802.11k standard.

The wireless communication device 20B that has completed the measurement of the probe frames transmits a "direct link transmission measurement report" frame, which is a dedicated relay data frame, to the wireless communication device 20A via the base station 30 as soon as preparation for the measurement report is completed (step S432 and step S434). The "direct link transmission measurement report" includes the MAC address of the base station 30, the average RCPI of the probe frames whose TAs are the address of the base station 30, the MAC address of the wireless communication device 20A, and the average RCPI of the probe frames whose TAs are the address of the wireless communication device 20A. When the wireless communication device 20A can receive and interpret the "direct link transmission measurement report" from the wireless communication device 20B, it proceeds to the path determination process.

4-3. Third Operation Example

The second operation example of the wireless communication system 1 according to the present embodiment is described above. In the second operation example, the wireless communication device 20B measures the quality of the probe frames transmitted from the wireless communication device 20A that independently performs the path determination process. On the other hand, a third operation example differs in that the wireless communication device 20B transmits probe frames, and the wireless communication device 20A measures the quality of the probe frames. Hereinafter the third operation example will be described with reference to FIG. 9.

Figure 9:
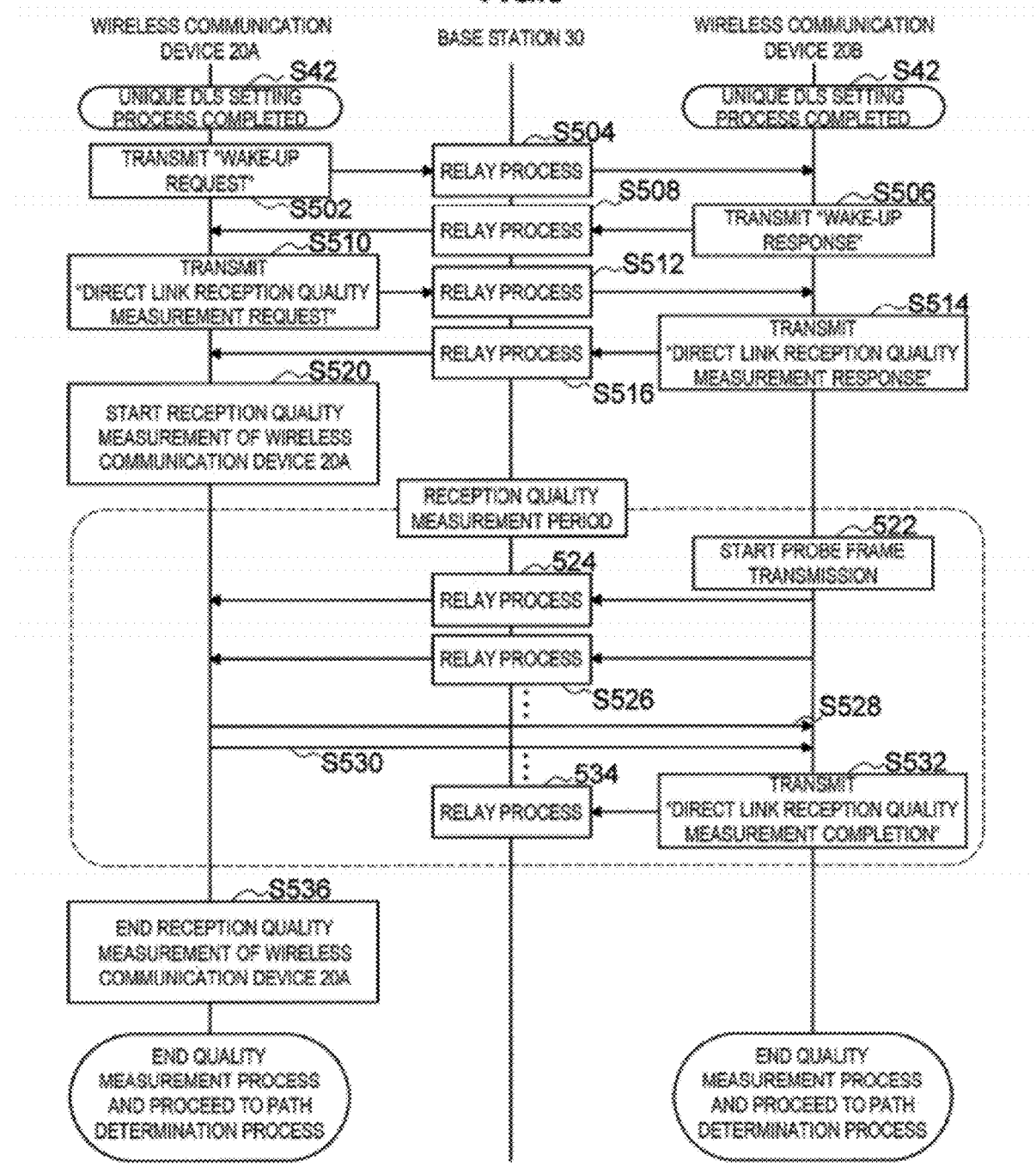
FIG. 9 is a sequence diagram that shows the flow of a link quality measurement process according to a third operation example.

FIG. 9 is a sequence diagram that shows the flow of a link quality measurement process according to the third operation example. As shown in FIG. 9, first, taking into consideration a case where the wireless communication device 20B that is expected to measure link quality is in a power save (PS) mode, the wireless communication device 20A transmits a "wake-up request", which is a dedicated relay data frame, to the wireless communication device 20B via the base station 30 (step S502 and step S504). When the wireless communication device 20B can receive the "wake-up request" and interpret the content thereof, it transmits a "wake-up response" frame, which is a dedicated relay data frame, to the wireless communication device 20A (step S506 and step S508), and maintains an awake state for a certain time period in accordance with the "wake-up request".

Then, the wireless communication device 20A that has received the "wake-up response" and interpreted the content thereof transmits a "direct link reception quality measurement request" frame, which is a dedicated relay data frame, to the wireless communication device 20B via the base station 30 (step S510 and step S512). The content of the "direct link reception quality measurement request" includes the MAC address of the base station 30 (BSSID) and the MAC address of the wireless communication device 20A. When the wireless communication device 20B can receive and interpret the "direct link reception quality measurement request", it transmits a "direct link reception quality measurement response", which is a dedicated relay data frame, to the wireless communication device 20A via the base station 30 (step S514 and step S516). The "direct link reception quality measurement response" includes information about whether or not the requested measurement is possible.

Then, if success and failure information included in the "direct link reception quality measurement response" indicates "measurable", the wireless communication device 20A starts the measurement of the reception quality of the wireless communication device 20A (step S520). The wireless communication device 20B starts to transmit a probe frame to cause the wireless communication device 20A to measure the reception quality (step S522). After the wireless communication device 20B has transmitted probe frames via the base station 30 over a predetermined period (or a specified number of times) (step S524 and step S526), it transmits probe frames directly to the wireless communication device 20A (step S528 and step S530). More specifically, after the wireless communication device 20B has transmitted probe frames including the RA in which the address of the base station 30 is described and the DA in which the address of the wireless communication device 20A is described, it transmits probe frames including the RA in which the address of the wireless communication device 20A is described.

After that, the wireless communication device 20B transmits a "direct link reception quality measurement completion", which is a dedicated relay data frame (step S532), and the base station 30 relays the "direct link reception quality measurement completion" to the wireless communication device 20A (step S534).

Until the wireless communication device 20A receives the "direct link reception quality measurement completion" from the wireless communication device 20B, it receives the probe frames including the RA in which the address of the wireless communication device 20A is described (step S536). Then, for the frames whose TAs (transmitter addresses) are the address of the base station 30 (BSSID), and for the frames whose TAs are the address of the wireless communication device 20B (namely, traffic serving as a direct link path), the wireless communication device 20A measures received total channel power (RCPI) and the number of received packets, and stores the average value in the memory 232. The format of the RCPI may be the same as that defined by the 802.11k standard. Then, the wireless communication device 20A shifts from the link quality measurement process to the path determination process.

4-4. Fourth Operation Example

The third operation example of the wireless communication system 1 according to the present embodiment is described above. In the operation examples described above, probe frames are transmitted only in one direction, either from the wireless communication device 20A to the wireless communication device 20B, or from the wireless communication device 20B to the wireless communication device 20A. On the other hand, in a fourth operation example, the wireless communication device 20A and the wireless communication device 20B can transmit probe frames bidirectionally, and bidirectional link quality can be obtained. As a result, a communication path can be determined more appropriately. Hereinafter, the fourth operation example will be described with reference to FIG. 10.

Figure 10:
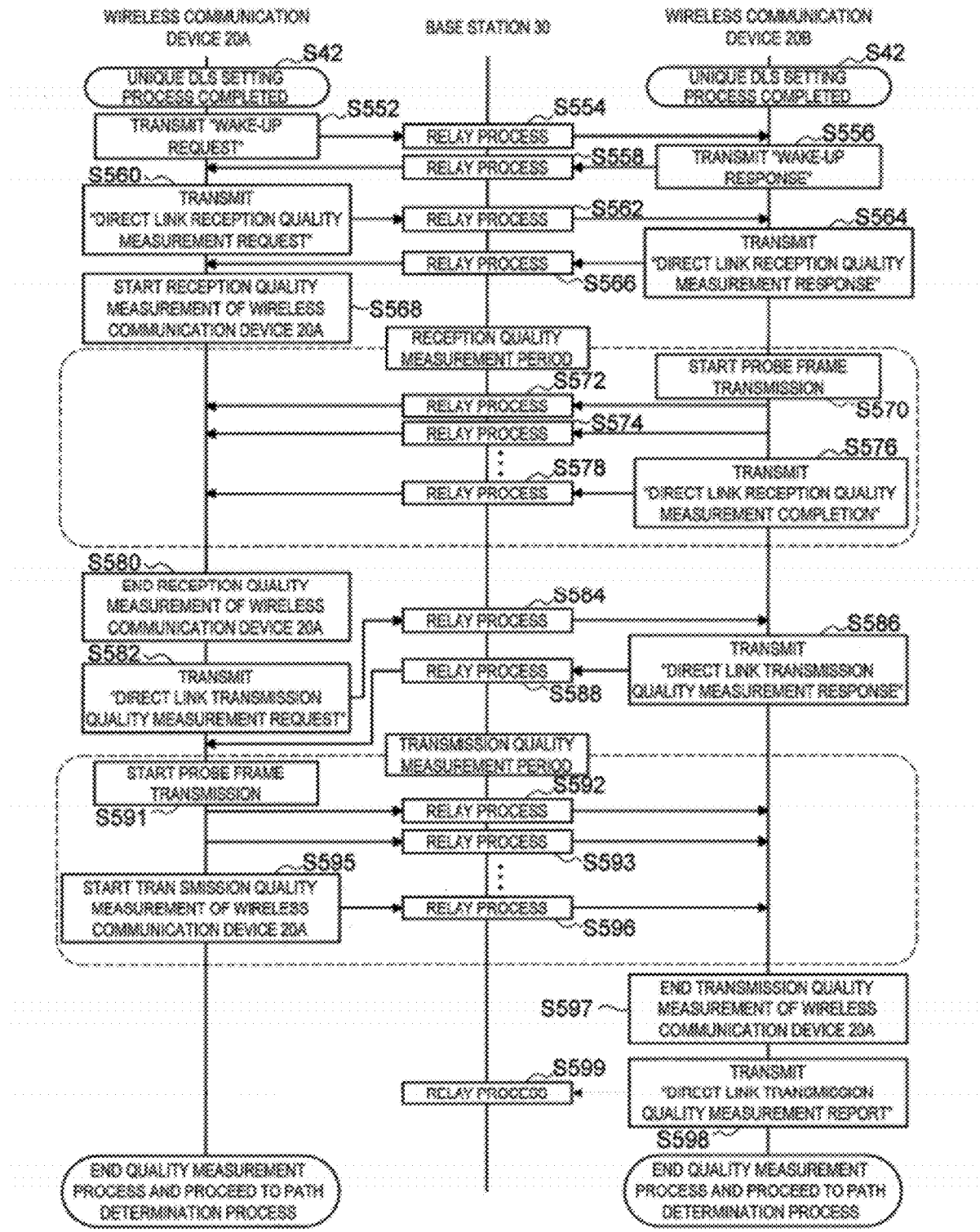
FIG. 10 is a sequence diagram that shows the flow of a link quality measurement process according to a fourth operation example.

FIG. 10 is a sequence diagram that shows the flow of a link quality measurement process according to the fourth operation example. As shown in FIG. 10, first, taking into consideration a case where the wireless communication device 20B that is expected to measure link quality is in a power save (PS) mode, the wireless communication device 20A transmits a "wake-up request", which is a dedicated relay data frame, to the wireless communication device 20B via the base station 30 (step S552 and step S554). When the wireless communication device 20B can receive the "wake-up request" and interpret the content thereof, it transmits a "wake-up response" frame, which is a dedicated relay data frame, to the wireless communication device 20A (step S556 and step S558), and maintains an awake state for a certain time period according to the "wake-up request".

Then, the wireless communication device 20A that has received the "wake-up response" and interpreted the content thereof transmits a "direct link reception quality measurement request" frame, which is a dedicated relay data frame, to the wireless communication device 20B via the base station 30 (step 560 and step S562). The content of the "direct link reception quality measurement request" includes the MAC address of the base station 30 (BSSID) and the MAC address of the wireless communication device 20A. When the wireless communication device 20B can receive and interpret the "direct link reception quality measurement request", it transmits a "direct link reception quality measurement response", which is a dedicated relay data frame, to the wireless communication device 20A via the base station 30 (step S564 and step S566). The "direct link reception quality measurement response" includes information about whether or not the requested measurement is possible.

Then, if success and failure information included in the "direct link reception quality measurement response" indicates "measurable", the wireless communication device 20A starts the measurement of the reception quality of the wireless communication device 20A (step S568). The wireless communication device 20B starts to transmit a probe frame to cause the wireless communication device 20A to measure the reception quality (step S570). More specifically, the wireless communication device 20B transmits probe frames including the RA in which the address of the base station 30 is described and the DA in which the address of the wireless communication device 20A is described. The base station 30 changes the TA of each of the probe frames received from the wireless communication device 20B to the address of the base station 30 and changes the RA to the address of the wireless communication device 20A, and transmits the probe frames (step S572 and step S574).

After that, the wireless communication device 20B transmits a "direct link reception quality measurement completion", which is a dedicated relay data frame (step S576), and the base station 30 relays the "direct link reception quality measurement completion" to the wireless communication device 20A (step S578).

Until the wireless communication device 20A receives the "direct link reception quality measurement completion" from the wireless communication device 20B, it receives both the probe frames including the RA in which the address of the wireless communication device 20A is described and the probe frames including the TA in which the address of the wireless communication device 20B is described (step S580). Then, for the frames whose TAs (transmitter addresses) are the address of the base station 30 (BSSID), and for the frames whose TAs are the address of the wireless communication device 20B (namely, traffic serving as a direct link path), the wireless communication device 20A measures received total channel power (RCPI) and the number of received packets, and stores the average value in the memory 232.

Then, the wireless communication device 20A transmits a "direct link transmission quality measurement request" frame, which is a dedicated relay data frame, to the wireless communication device 20B via the base station 30 (step S582 and step S584). The content of the "direct link transmission quality measurement request" includes the MAC address of the base station 30 (BSSID) and the MAC address of the wireless communication device 20A. When the wireless communication device 20B can receive and interpret the "direct link transmission quality measurement request", it transmits a "direct link transmission quality measurement response", which is a dedicated relay data frame, to the wireless communication device 20A via the base station 30 (step S586 and step S588). The "direct link transmission quality measurement response" includes information about whether or not the requested measurement is possible. Then, the wireless communication device 20B starts the measurement of the transmission quality of the wireless communication device 20A (step S590).

In the fourth operation example, when the wireless communication device 20A transmits a probe frame via the base station 30, it is assumed that the wireless communication device 20B can receive both the probe frame transmitted from the base station 30 and the probe frame transmitted from the wireless communication device 20A. In other words, it is assumed that the wireless communication device 20B can receive the probe frame including the RA in which the address of the wireless communication device 20B is described, and the probe frame including the RA in which the address of the base station 30 is described. Further, it is assumed that the wireless communication device 20A has recognized the matter in the unique DLS setting process.

Then, if success and failure information included in the "direct link transmission quality measurement response" indicates "measurable", the wireless communication device 20A starts to transmit a probe frame to cause the wireless communication device 20B to measure the transmission quality (step S591). More specifically, the wireless communication device 20A transmits probe frames including the RA in which the address of the base station 30 is described, the TA in which the address of the wireless communication device 20A is described, and the DA in which the address of the wireless communication device 20B is described, a specified number of times. The base station 30 changes the RA of each of the probe frames received from the wireless communication device 20A to the address of the wireless communication device 20B, changes the TA to the address of the base station 30, and transmits the probe frames (step S592, step S593 and step S594).

After that, the wireless communication device 20A transmits a "direct link transmission quality measurement completion", which is a dedicated relay data frame (step S595), and the base station 30 relays the "direct link transmission quality measurement completion" to the wireless communication device 20B (step S596).

Until the wireless communication device 20B receives the "direct link transmission quality measurement completion" from the wireless communication device 20A, it receives the probe frames including the TA in which the address of the wireless communication device 20A is described that are transmitted from the wireless communication device 20A, in addition to the probe frames including the RA in which the address of the wireless communication device 20B is described that are transmitted from the base station 30 (step S597). Then, for the probe frames transmitted from the base station 30 and for the probe frames transmitted from the wireless communication device 20A, the wireless communication device 20B measures received total channel power (RCPI) and the number of received packets, and stores the average value in the memory 232. The format of the RCPI may be the same as that defined by the 802.11k standard.

The wireless communication device 20B that has completed the measurement of the probe frames transmits a "direct link transmission measurement report" frame, which is a dedicated relay data frame, to the wireless communication device 20A via the base station 30 as soon as preparation for the measurement report is completed (step S598 and step S599). The "direct link transmission measurement report" includes the MAC address of the base station 30, the average RCPI of the probe frames whose TAs are the address of the base station 30, the MAC address of the wireless communication device 20A, and the average RCPI of the probe frames whose TAs are the address of the wireless communication device 20A. When the wireless communication device 20A can receive and interpret the "direct link transmission measurement report" from the wireless communication device 20B, it proceeds to the path determination process.

The flow of the path determination process according to the fourth operation example is common to that of the first operation example. However, in the fourth operation example, when the link quality measurement process is completed, the wireless communication device 20A has already obtained information about the RCPI of the base station path from the base station 30 to the wireless communication device 20A and the RCPI of the direct link path from the wireless communication device 20B to the wireless communication device 20A, in addition to information about the RCPI of the base station path from the base station 30 to the wireless communication device 20B and the RCPI of the direct link path from the wireless communication device 20A to the wireless communication device 20B. Therefore, the wireless communication device 20A can determine whether to use the base station path or the direct link path, based on the above information. For example, the wireless communication device 20A may set the communication path by calculating a difference in bilateral RCPI and taking a difference in the absolute transmission power into consideration.

4-5. Fifth Operation Example

The fourth operation example of the wireless communication system 1 according to the present embodiment is described above. In the operation examples described above, frame quality measurement is started after the "direct link reception quality measurement request" or the "direct link transmission quality measurement request". On the other hand, a fifth operation example differs in that the frame quality measurement is started at an earlier timing. Hereinafter, the fifth operation example will be described with reference to FIG. 11.

Figure 11:
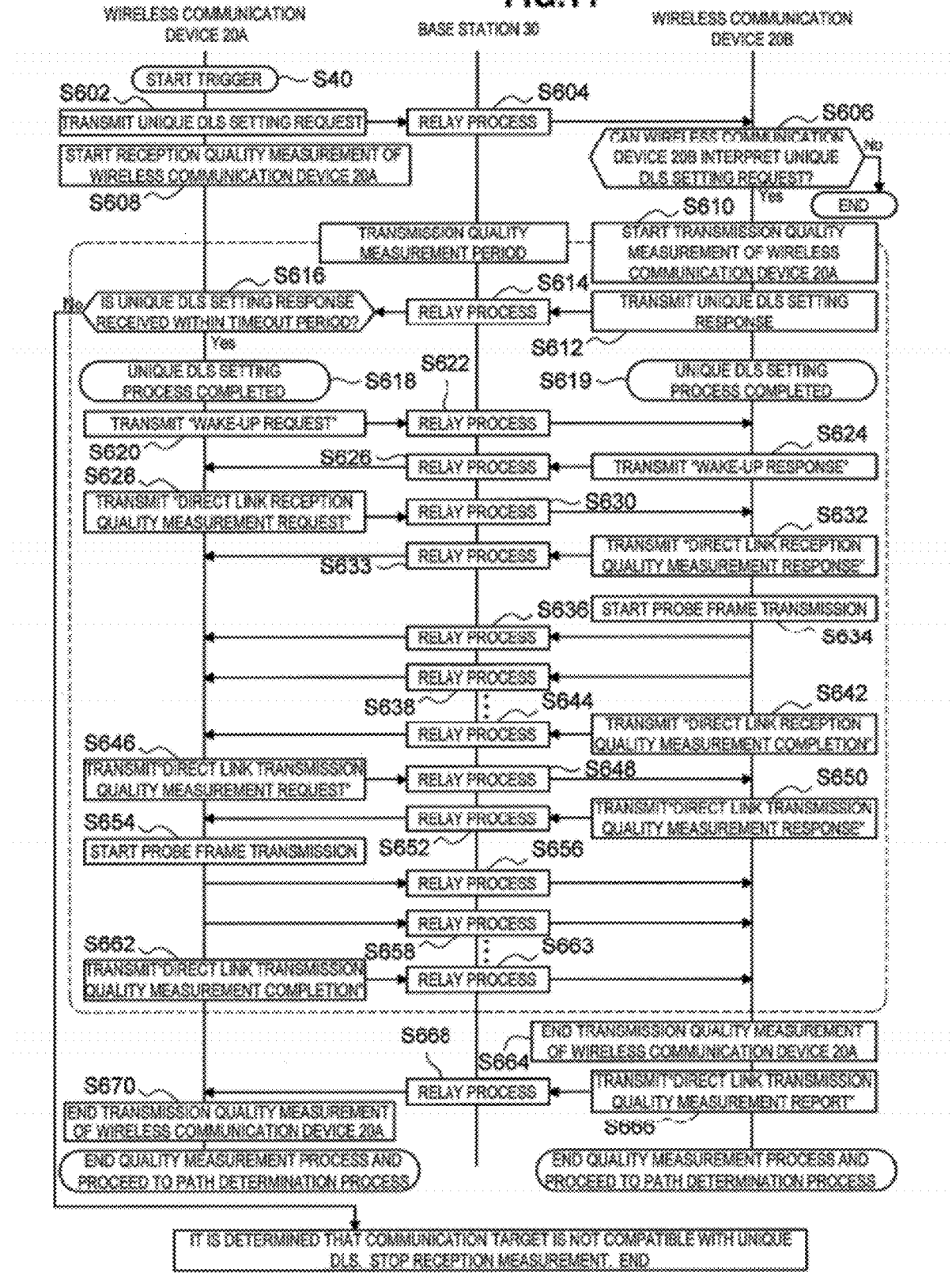
FIG. 11 is a sequence diagram that shows a fifth operation example of a wireless communication system 1.

FIG. 11 is a sequence diagram that shows the fifth operation example of the wireless communication system 1. First, when a start trigger occurs, the wireless communication device 20A transmits a "unique DLS setting request", which is a dedicated relay data frame, to the wireless communication device 20B (step S602). More specifically, the unique DLS setting request frame is capsulated as a specific Ethertype data frame for the unique DLS.

Here, the flow of the unique DLS setting process will be described again with reference to FIG. 4. When the wireless communication device 20A transmits a "unique DLS setting request", the base station 30 receives the "unique DLS setting request". The "unique DLS setting request" includes an ID indicating that the content of the frame is the "unique DLS setting request", the MAC addresses of the wireless communication devices 20A and 20B, the BSSID, capability information of the wireless communication device 20A, and the like. The base station 30 that has received such a "unique DLS setting request" relays the "unique DLS setting request" to the wireless communication device 20B without regard to the content of the "unique DLS setting request" (step S604).

When the wireless communication device 20B receives the "unique DLS setting request" from the wireless communication device 20A via the base station 30, it interprets the content of the "unique DLS setting request" from the Ethertype. When the wireless communication device 20B itself is compatible with the unique DLS and it can interpret the content of the "unique DLS setting request" (step S606), the wireless communication device 20B starts to measure the transmission quality of the wireless communication device 20A (step S610). Meanwhile, the wireless communication device 20A that has transmitted the "unique DLS setting request" starts to measure the reception quality of the wireless communication device 20A (step S608). That is, in the fifth operation example, the "unique DLS setting request" has part of the function of "the direct link reception quality measurement request" or the "the direct link transmission quality measurement request" in the first to fourth operation examples.

Further, the wireless communication device 20B transmits a "unique DLS setting response" to the wireless communication device 20A (step S612). Like the "unique DLS setting request", the "unique DLS setting response" also includes an ID indicating that the content of the frame is the "unique DLS setting response", the MAC addresses of the wireless communication devices 20A and 20B, the BSSID, capability information of the wireless communication device 20B, success and failure information, and the like. Note that when the wireless communication device 20B is not compatible with the unique DLS, the "unique DLS setting request" is treated as an unknown Ethertype frame. Therefore, the wireless communication device 20B cannot interpret the content of the frame, and the frame is cleared in the wireless communication device 20B.

When the base station 30 receives the "unique DLS setting response" transmitted from the wireless communication device 20B, it relays the "unique DLS setting response" to the wireless communication device 20A without regard to the content of the "unique DLS setting response" (step S614). When the wireless communication device 20A receives the "unique DLS setting response" from the wireless communication device 20B via the base station 30, it interprets the content thereof from the Ethertype (step S616). When success and failure information of the "unique DLS setting response" indicates "success", the control portion 228 completes the setting of the unique DLS (step S618). On the other hand, when the wireless communication device 20A cannot receive the "unique DLS setting response" within a timeout period, the control portion 228 determines that the wireless communication device 20B is not compatible with the unique DLS, and a direct link is not established.

After that, taking into consideration a case where the wireless communication device 20B that is expected to measure link quality is in a power save (PS) mode, the wireless communication device 20A transmits a "wake-up request", which is a dedicated relay data frame, to the wireless communication device 20B via the base station 30 (step S620 and step S622). When the wireless communication device 20B can receive the "wake-up request" and interpret the content thereof, it transmits a "wake-up response" frame, which is a dedicated relay data frame, to the wireless communication device 20A (step S624 and step S626), and maintains an awake state for a certain time period in accordance with the "wake-up request".

Then, the wireless communication device 20A that has received the "wake-up response" and interpreted the content thereof transmits a "direct link reception quality measurement request" frame, which is a dedicated relay data frame, to the wireless communication device 20B via the base station 30 (step S628 and step S630). The content of the "direct link reception quality measurement request" includes the MAC address of the base station 30 (BSSID) and the MAC address of the wireless communication device 20A. When the wireless communication device 20B can receive and interpret the "direct link reception quality measurement request", it transmits a "direct link reception quality measurement response", which is a dedicated relay data frame, to the wireless communication device 20A via the base station 30 (step S632 and step S633). The "direct link reception quality measurement response" includes information about whether or not the requested measurement is possible.

Then, the wireless communication device 20B starts to transmit a probe frame to cause the wireless communication device 20A to measure the reception quality (step S634). More specifically, the wireless communication device 20B transmits probe frames including the RA in which the address of the base station 30 is described and the DA in which the address of the wireless communication device 20A is described. The base station 30 changes the TA of each of the probe frames received from the wireless communication device 20B to the address of the base station 30 and changes the RA to the address of the wireless communication device 20A, and transmits the probe frames (step S636 and step S638).

After that, the wireless communication device 20B transmits a "direct link reception quality measurement completion", which is a dedicated relay data frame (step S642), and the base station 30 relays the "direct link reception quality measurement completion" to the wireless communication device 20A (step S644).

Until the wireless communication device 20A receives the "direct link reception quality measurement completion" from the wireless communication device 20B, it receives both the probe frames including the RA in which the address of the wireless communication device 20A is described and the probe frames including the TA in which the address of the wireless communication device 20B is described (step S580). Then, for the frames whose TAs (transmitter addresses) are the address of the base station 30 (BSSID), and for the frames whose TAs are the address of the wireless communication device 20B (namely, traffic serving as a direct link path), the wireless communication device 20A measures received total channel power (RCPI) and the number of received packets, and stores the average value in the memory 232.

Then, the wireless communication device 20A transmits a "direct link transmission quality measurement request" frame, which is a dedicated relay data frame, to the wireless communication device 20B via the base station 30 (step S646 and step S648). The content of the "direct link transmission quality measurement request" includes the MAC address of the base station 30 (BSSID) and the MAC address of the wireless communication device 20A. When the wireless communication device 20B can receive and interpret the "direct link transmission quality measurement request", it transmits a "direct link transmission quality measurement response", which is a dedicated relay data frame, to the wireless communication device 20A via the base station 30 (step S650 and step S652). The "direct link transmission quality measurement response" includes information about whether or not the requested measurement is possible.

In the fifth operation example, when the wireless communication device 20A transmits a probe frame via the base station 30, it is assumed that the wireless communication device 20B can receive both the probe frame transmitted from the base station 30 and the probe frame transmitted from the wireless communication device 20A. In other words, it is assumed that the wireless communication device 20B can receive the probe frame including the RA in which the address of the wireless communication device 20B is described, and the probe frame including the RA in which the address of the base station 30 is described. Further, it is assumed that the wireless communication device 20A has recognized the matter in the unique DLS setting process.

Then, if success and failure information included in the "direct link transmission quality measurement response" indicates "measurable", the wireless communication device 20A starts to transmit a probe frame to cause the wireless communication device 20B to measure the transmission quality (step S654). More specifically, the wireless communication device 20A transmits a probe frame including the RA in which the address of the base station 30 is described, the TA in which the address of the wireless communication device 20A is described, and the DA in which the address of the wireless communication device 20B is described, a specified number of times. The base station 30 changes the RA of each of the probe frames received from the wireless communication device 20A to the address of the wireless communication device 20B, changes the TA to the address of the base station 30, and transmits the probe frames (step S656 and step 658).

After that, the wireless communication device 20A transmits a "direct link transmission quality measurement completion", which is a dedicated relay data frame (step S662), and the base station 30 relays the "direct link transmission quality measurement completion" to the wireless communication device 20B (step S663).

Until the wireless communication device 20B receives the "direct link transmission quality measurement completion" from the wireless communication device 20A, it receives the probe frames including the TA in which the address of the wireless communication device 20A is described that are transmitted from the wireless communication device 20A, in addition to the probe frames including the RA in which the address of the wireless communication device 20B is described that are transmitted from the base station 30 (step S664). Then, for the probe frames transmitted from the base station 30 and for the probe frames transmitted from the wireless communication device 20A, the wireless communication device 20B measures received total channel power (RCPI) and the number of received packets, and stores the average value in the memory 232. The format of the RCPI may be the same as that defined by the 802.11k standard.

The wireless communication device 20B that has completed the measurement of the probe frames transmits a "direct link transmission measurement report" frame, which is a dedicated relay data frame, to the wireless communication device 20A via the base station 30 as soon as preparation for the measurement report is completed (step S666 and step S668). The "direct link transmission measurement report" includes the MAC address of the base station 30, the average RCPI of the probe frames whose TAs are the address of the base station 30, the MAC address of the wireless communication device 20A, and the average RCPI of the probe frames whose TAs are the address of the wireless communication device 20A. Then, the wireless communication device 20A ends the reception quality measurement of the wireless communication device 20A, and proceeds to a path determination process. Note that, when the unique DLS setting is not established, the wireless communication device 20A immediately ends the reception quality measurement. The path determination process of the fifth operation example can be performed in substantially the same manner as that of the fourth operation example, and therefore, a description thereof will be omitted.

As described above, in the fifth operation example, a dedicated relay data frame, such as the "direct link reception quality measurement request" and the "direct link transmission quality measurement request", can also be used as a sample for quality measurement. As a result, the wireless communication device 20A can appropriately determine a communication path based on more information.

5. CONCLUSION

As described above, without regard to the contents of a "unique DLS setting request", and a "unique DLS setting response" that are dedicate relay data frames, the base station 30 relays the "unique DLS setting request" and the "unique DLS setting response" between the wireless communication devices 20A and 20B. When the wireless communication device 20B receives a "unique DLS setting request" that is a dedicated relay data frame relayed by the base station 30, if the wireless communication device 20B is compatible with a direct link, it transmits a "unique DLS setting response" that is a dedicated relay data frame. Further, the wireless communication device 20A can determine that the wireless communication device 20B is compatible with the direct link, based on the fact that it has received the "unique DLS setting response" that is a dedicated relay data frame relayed by the base station 30. That is, even when the base station 30 cannot interpret the contents of the "unique DLS setting request" and the "unique DLS setting response" that are dedicated relay data frames, the wireless communication device 20A can confirm whether or not the wireless communication device 20B is compatible with the direct link. Then, by way of the link quality measurement process and the path determination process, it is possible to communicate using either the base station path or the direct link path.

It should be understood by those skilled in the art that various modifications, combinations, sub-combinations and alterations may occur depending on design requirements and other factors insofar as they are within the scope of the appended claims or the equivalents thereof.

There is no need to perform respective processing steps of the wireless communication system 1 in a time series in the order described in the sequence diagrams. For example, the respective processing steps of the wireless communication system 1 may include processing that is performed in parallel or separately (for example, parallel processing or object processing).

What is claimed is:

1. A wireless communication system, comprising:
   a first wireless communication device;
   a second wireless communication device; and
   a base station that relays wireless communication between the first and the second wireless communication devices, wherein
   the first wireless communication device is capable of direct communication with another wireless communication device, and transmits a first data frame of a particular frame type to the second wireless communication device via the base station,
   if the second wireless communication device is capable of the direct communication, when receiving the first data frame of the particular frame type, the second wireless communication device transmits a second data frame of the particular frame type via the base station,
   when the first wireless communication device receives the second data frame from the second wireless communication device, the first wireless communication device determines that the second wireless communication device is capable of the direct communication,
   when the first wireless communication device determines that the second wireless communication device is capable of the direct communication, the first wireless communication device transmits a predetermined data frame,
   when the base station receives the predetermined data frame from the first wireless communication device, the base station transmits the predetermined data frame to the second wireless communication device, and
   the second wireless communication device measures signal quality of both the predetermined data frame transmitted from the first wireless communication device and the predetermined data frame transmitted from the base station, and transmits the measured signal quality to the first wireless communication device.

2. The wireless communication system according to claim 1, wherein
   the first wireless communication device determines, based on the signal quality transmitted from the second wireless communication device, whether to communicate with the second wireless communication device via the base station or to perform the direct communication.

3. The wireless communication system according to claim 1, wherein
when the first wireless communication device determines that the second wireless communication device is capable of the direct communication, the first wireless communication device transmits a predetermined data frame to the second wireless communication device via the base station, and also transmits the predetermined data frame to the second wireless communication device directly, and
the second wireless communication device sequentially measures signal quality of both the predetermined data frame directly received from the first wireless communication device and the predetermined data frame received from the base station, and transmits the measured signal quality to the first wireless communication device.

4. The wireless communication system according to claim 1, wherein
when the first wireless communication device determines that the second wireless communication device is capable of the direct communication, the first wireless communication device transmits a third data frame of the particular frame type to the second wireless communication device, and
when the second wireless communication device receives the third data frame from the first wireless communication device, the second wireless communication device transmits a predetermined data frame to the first wireless communication device via the base station.

5. The wireless communication system according to claim 4, wherein
the second wireless communication device further transmits the predetermined data frame to the first wireless communication device directly.

6. The wireless communication system according to claim 1, wherein
when the second wireless communication device receives the first data frame from the first wireless communication device, the second wireless communication device measures signal quality of subsequently transmitted data frames.

7. The wireless communication system according to claim 1, wherein
when the first wireless communication device transmits the first data frame, the first wireless communication device measures signal quality of subsequently transmitted data frames.

8. The wireless communication system according to claim 1, wherein
when the base station receives a data frame from one of the first wireless communication device and the second wireless communication device, the base station transmits the data frame to a destination wireless communication device without regard to whether the data frame is of the particular frame type.

9. The wireless communication system according to claim 1, wherein
when the first wireless communication device confirms presence of the second wireless communication device based on a universal plug and play (UPnP) protocol, the first wireless communication device transmits the first data frame.

10. A wireless communication device capable of communication with another wireless communication device via a base station, comprising:
a transmitting portion that transmits a first data frame of a particular frame type to the other wireless communication device via the base station;
a receiving portion that, when the other wireless communication device has a direct communication function with the wireless communication device, receives a second data frame of the particular frame type that is transmitted from the other wireless communication device in response to the first data frame; and
a determination portion that, when the receiving portion receives the second data frame from the other wireless communication device, determines that the other wireless communication device has the direct communication function,
wherein when the wireless communication device determines that the other wireless communication device is capable of the direct communication function, the wireless communication device transmits a predetermined data frame to the other wireless communication device via the base station, and also transmits the predetermined data frame to the other wireless communication device directly, and
the other wireless communication device sequentially measures signal quality of both the predetermined data frame directly received from the wireless communication device and the predetermined data frame received from the base station, and transmits the measured signal quality to the wireless communication device.

11. A wireless communication device capable of communication with another wireless communication device via a base station, comprising:
a receiving portion that receives a first data frame of a particular frame type from the other wireless communication device; and
a transmitting portion that, when the wireless communication device has a direct communication function with the other wireless communication device, transmits a second data frame of the particular frame type in response to the first data frame,
wherein when the wireless communication device confirms a presence of the other wireless communication device based on a universal plug and play (UPnP) protocol, the wireless communication device transmits the second data frame.

12. A wireless communication method used by a wireless communication system that includes a first wireless communication device, a second wireless communication device, and a base station that relays wireless communication between the first and the second wireless communication devices, the wireless communication method comprising the steps of:
transmitting a first data frame of a particular frame type from the first wireless communication device capable of direct communication with another wireless communication device to the second wireless communication device via the base station;
receiving the first data frame by the second wireless communication device;
transmitting a second data frame of the particular frame type from the second wireless communication device when the second wireless communication device is capable of the direct communication;
receiving the second data frame by the first wireless communication device; and determining, by the first communication device, that the second wireless communication device is capable of the direct communication, wherein when the first wireless communication device determines that the second wireless communication device is capable of the direct communication, the first wireless communication device transmits a predetermined data frame, when the base station receives the predetermined data frame from the first wireless communication device, the base station transmits the predetermined data frame to the second wireless communication device, and the second wireless communication device measures signal quality of both the predetermined data frame transmitted from the first wireless communication device and the predetermined data frame transmitted from the base station, and transmits the measured signal quality to the first wireless communication device.

13. A non-transitory computer storage medium for storing a program comprising instructions that command a computer, provided in a wireless communication device capable of communication with another wireless communication device via a base station, to function as a control portion executing the steps of:

causing a transmitting device to transmit a first data frame of a particular frame type to the other wireless communication device via the base station;

causing a receiving device to receive a second data frame of the particular frame type that is transmitted from the other wireless communication device in response to the first data frame when the other wireless communication device has a direct communication function with the wireless communication device; and determining, when the receiving device receives the second data frame from the other wireless communication device, that the other wireless communication device has the direct communication function, wherein when the wireless communication device determines that the other wireless communication device is capable of the direct communication function, the wireless communication device transmits a predetermined data frame to the other wireless communication device via the base station, and also transmits the predetermined data frame to the other wireless communication device directly, and the other wireless communication device sequentially measures signal quality of both the predetermined data frame directly received from the wireless communication device and the predetermined data frame received from the base station, and transmits the measured signal quality to the wireless communication device.

14. A wireless communication apparatus in a wireless communication system including a first wireless communication device, a second wireless communication device, and a base station that relays wireless communication between the first and the second wireless communication devices, wherein the first wireless communication device is the wireless communication apparatus, the first wireless communication device, comprising:

an antenna for transmitting a signal;

a data processing portion for generating, processing and analyzing a plurality of data frames;

a transmission processing portion for processing the plurality of data frames received from the data processing portion, analyzing the plurality of data frames received from a wireless interface, and supplying the plurality of data frames to the data processing portion, the wireless interface generating a signal based on the plurality of data frames supplied from the transmission processing portion and decoding the plurality of data frames;

a control portion for controlling a reception operation and a transmission operation of the first wireless communication device;

a storage medium for storing the plurality of data frames;

a relay data frame processing portion for generating, processing and analyzing a dedicated relay data frame as a specific data frame; and a measurement portion for measuring a quality of the data frame received from the second wireless communication device, wherein the first wireless communication device is capable of direct communication with the second wireless communication device, and transmits a first data frame of a particular frame type to the second wireless communication device via the base station, wherein if the second wireless communication device is capable of the direct communication, when receiving the first data frame of the particular frame type, the second wireless communication device transmits a second data frame of the particular frame type via the base station, wherein the first wireless communication device determines that the second wireless communication device is capable of the direct communication when the first wireless communication device receives the second data frame from the second wireless communication device, wherein the first wireless communication device transmits a predetermined data frame when the first wireless communication device determines that the second wireless communication device is capable of the direct communication, wherein the base station transmits the predetermined data frame to the second wireless communication device when the base station receives the predetermined data frame from the first wireless communication device, and wherein the second wireless communication device measures signal quality of both the predetermined data frame transmitted from the first wireless communication device and the predetermined data frame transmitted from the base station, and transmits the measured signal quality to the first wireless communication device.

15. A wireless communication apparatus in a wireless communication system, comprising:

a first wireless communication device;

a second wireless communication device; and a base station that relays wireless communication between the first and the second wireless communication devices, wherein the first wireless communication device is the wireless communication apparatus, wherein the first wireless communication device is capable of direct communication with the second wireless communication device, and transmits a first data frame of a particular frame type to the second wireless communication device via the base station, wherein if the second wireless communication device is capable of the direct communication, when receiving the first data frame of the particular frame type, the second wireless communication device transmits a second data frame of the particular frame type via the base station, wherein the first wireless communication device determines that the second wireless communication device is capable of the direct communication when the first wireless communication device receives the second data frame from the second wireless communication device, wherein the first wireless communication device transmits a predetermined data frame when the first wireless communication device determines that the second wireless communication device is capable of the direct communication, wherein the base station transmits the predetermined data frame to the second wireless communication device when the base station receives the predetermined data frame from the first wireless communication device, and wherein the second wireless communication device measures signal quality of both the predetermined data frame transmitted from the first wireless communication device and the predetermined data frame transmitted from the base station, and transmits the measured signal quality to the first wireless communication device.

* * * * *